(12) United States Patent
Yoshida et al.

(10) Patent No.: US 11,007,896 B2
(45) Date of Patent: May 18, 2021

(54) STORAGE APPARATUS, CONTROL APPARATUS, AND MOVING BODY

(71) Applicants: Masaaki Yoshida, Kanagawa (JP); Hideo Yanagita, Tokyo (JP)

(72) Inventors: Masaaki Yoshida, Kanagawa (JP); Hideo Yanagita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 700 days.

(21) Appl. No.: 15/568,193

(22) PCT Filed: Jun. 15, 2016

(86) PCT No.: PCT/JP2016/002884
§ 371 (c)(1),
(2) Date: Oct. 20, 2017

(87) PCT Pub. No.: WO2016/203763
PCT Pub. Date: Dec. 22, 2016

(65) Prior Publication Data
US 2018/0079317 A1    Mar. 22, 2018

(30) Foreign Application Priority Data

Jun. 16, 2015 (JP) .............................. JP2015-120731
Apr. 15, 2016 (JP) .............................. JP2016-082371

(51) Int. Cl.
*B60L 58/13* (2019.01)
*B60L 58/21* (2019.01)
(Continued)

(52) U.S. Cl.
CPC ............. *B60L 58/13* (2019.02); *B60L 3/0046* (2013.01); *B60L 11/1864* (2013.01);
(Continued)

(58) Field of Classification Search
CPC ........ B60L 58/13; B60L 58/21; B60L 3/0046; B60L 58/16; B60L 50/16; B60L 2250/16;
(Continued)

(56) References Cited

U.S. PATENT DOCUMENTS 5,614,804 A * 3/1997 Kayano et al. ....... H01M 10/44
320/134
5,955,869 A * 9/1999 Rathmann ............. H01M 10/42
320/132
(Continued)

FOREIGN PATENT DOCUMENTS

JP         7-294564 A    11/1995
JP      2001-351570 A    12/2001
(Continued)

OTHER PUBLICATIONS

International Search Report and Written Opinion dated Sep. 6, 2016 in PCT/JP2016/002884 filed on Jun. 15, 2016.
(Continued)

*Primary Examiner* — Dale W Hilgendorf
(74) *Attorney, Agent, or Firm* — Oblon, McClelland, Maier & Neustadt, L.L.P.

(57) ABSTRACT

A storage apparatus stores output property data including groups of residual capacities of a secondary battery and output densities corresponding to the residual capacities. In the output property data, both a difference between a residual capacity of a group that includes an extreme value in the output densities and a residual capacity of a group that includes an output density that immediately precedes the extreme value, and a difference between the residual capacity of the group that includes the extreme value in the output densities and a residual capacity of a group that includes an output density that immediately follows the extreme value (Continued)

are less than a difference between output densities of other groups adjacent to each other.

14 Claims, 13 Drawing Sheets

(51) Int. Cl.

| | |
|---|---|
| *H02J 7/00* | (2006.01) |
| *H01M 10/44* | (2006.01) |
| *H02J 7/14* | (2006.01) |
| *B60L 3/00* | (2019.01) |
| *B60L 58/16* | (2019.01) |
| *B60L 50/16* | (2019.01) |
| *H01M 4/58* | (2010.01) |
| *H01M 10/0525* | (2010.01) |
| *H01M 10/46* | (2006.01) |
| *H01M 10/48* | (2006.01) |
| *B60W 20/00* | (2016.01) |
| *H01M 10/052* | (2010.01) |
| *H01M 4/02* | (2006.01) |
| *B60L 11/18* | (2006.01) |

(52) U.S. Cl.
CPC ............... *B60L 50/16* (2019.02); *B60L 58/16* (2019.02); *B60L 58/21* (2019.02); *B60W 20/00* (2013.01); *H01M 4/5805* (2013.01); *H01M 10/0525* (2013.01); *H01M 10/44* (2013.01); *H01M 10/46* (2013.01); *H01M 10/48* (2013.01); *H02J 7/0048* (2020.01); *H02J 7/14* (2013.01); *B60L 2250/16* (2013.01); *H01M 10/052* (2013.01); *H01M 2004/028* (2013.01); *H01M 2220/20* (2013.01); *H02J 7/1446* (2013.01); *H02J 2310/48* (2020.01); *Y02E 60/10* (2013.01); *Y02T 10/70* (2013.01); *Y02T 10/7072* (2013.01); *Y02T 10/92* (2013.01); *Y10S 903/907* (2013.01)

(58) Field of Classification Search
CPC .... H02J 7/0048; H02J 7/14; H02J 7/23; H02J 2310/48; H01M 10/44; H01M 4/5805; H01M 10/0525; H01M 10/48; H01M 10/052; H01M 2004/028; H01M 2220/20; B60W 20/00; Y02E 60/10; Y02T 10/7072; Y02T 10/92; Y02T 10/70; Y10S 903/907

See application file for complete search history.

(56) References Cited

U.S. PATENT DOCUMENTS

| | | | |
|---|---|---|---|
| 8,380,452 B2* | 2/2013 | Maegawa et al. | ............................ G01R 31/3842 702/63 |
| 9,160,037 B2* | 10/2015 | Park | ...................... H01M 10/44 |
| 10,046,652 B2* | 8/2018 | Yoshida et al. | ...... Y02T 10/7072 |
| 2001/0008718 A1* | 7/2001 | Kobayashi | ............ H01M 10/44 429/9 |
| 2006/0097577 A1* | 5/2006 | Kato et al. | .............. Y02T 10/70 307/10.1 |
| 2010/0096918 A1* | 4/2010 | Sawada et al. | ......... B60L 50/16 307/9.1 |
| 2010/0280777 A1* | 11/2010 | Jin et al. | ................ B60L 3/0046 702/63 |
| 2011/0166732 A1 | 7/2011 | Yu et al. | |
| 2012/0105006 A1* | 5/2012 | Hara et al. | ............ H01M 10/44 320/128 |
| 2014/0125345 A1* | 5/2014 | Sejima et al. | ...... G01R 31/3835 324/426 |
| 2014/0183954 A1 | 7/2014 | Yoshida et al. | |
| 2015/0073614 A1 | 3/2015 | Yoshida et al. | |
| 2016/0185340 A1* | 6/2016 | Yoshida et al. | .......... B60K 6/48 701/22 |
| 2017/0261561 A1* | 9/2017 | Imamura et al. | ...... H01M 10/48 |
| 2017/0267115 A1* | 9/2017 | Unno et al. | ............. B60L 58/13 |
| 2017/0285109 A1* | 10/2017 | Kawamura et al. | .... Y02T 10/70 |

FOREIGN PATENT DOCUMENTS

| | | |
|---|---|---|
| JP | 2005-140596 A | 6/2005 |
| JP | 2008-109840 | 5/2008 |
| JP | 2012-181686 A | 9/2012 |
| JP | 2014-72978 A | 4/2014 |
| JP | 2014-518000 A | 7/2014 |
| JP | 2014-167457 | 9/2014 |
| JP | 5624333 | 11/2014 |
| JP | 2016-124536 | 7/2016 |

OTHER PUBLICATIONS

Extended European Search Report dated May 9, 2018 in European Patent Application No. 16811238.1 citing documents AA and AO therein, 10 pages.

Japanese Office Action dated Feb. 25, 2020, in Patent Application No. 2016-119179, 3 pages.

\* cited by examiner

[Fig. 1]
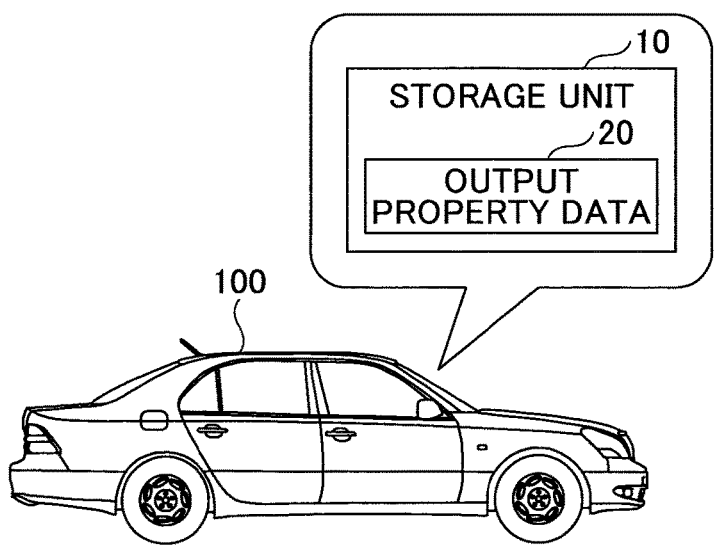
[Fig. 2]
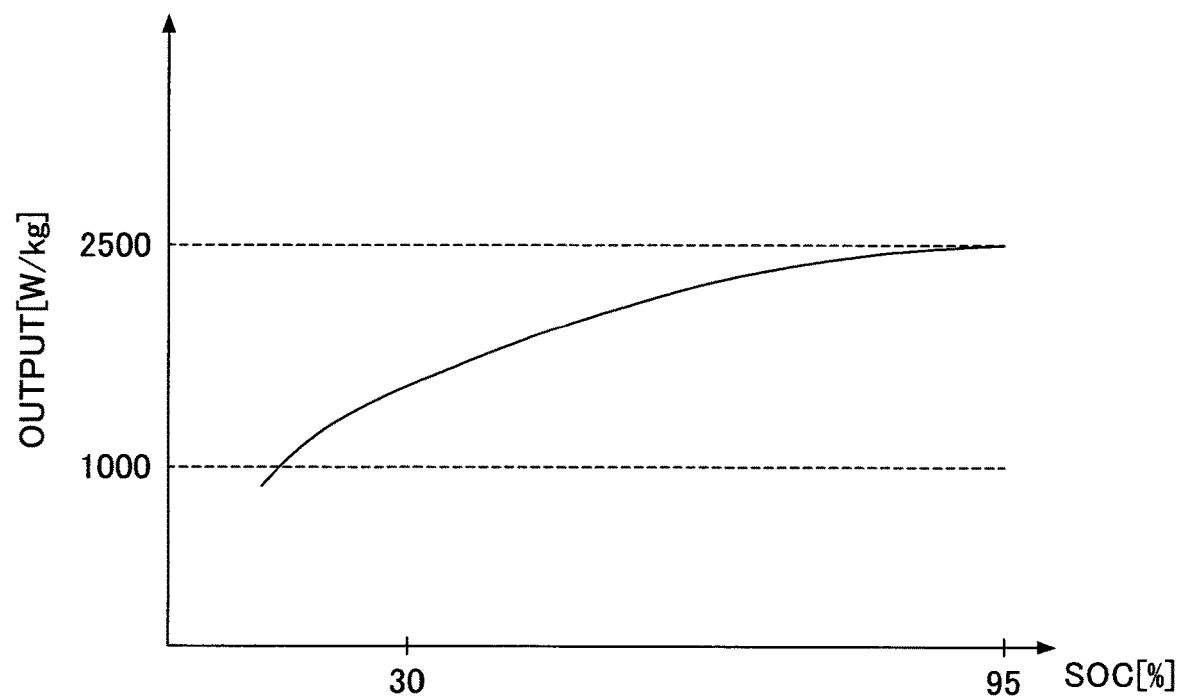

[Fig. 3]
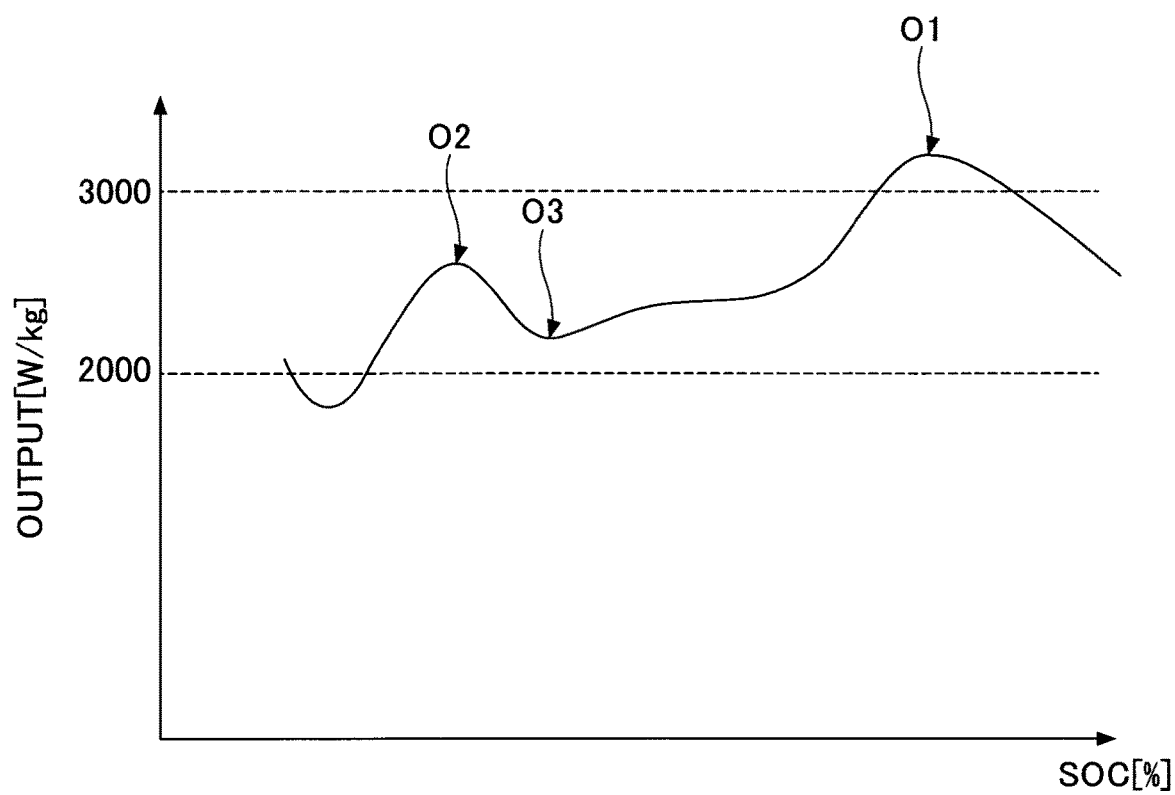

[Fig. 4]

| SOC[%] | OUTPUT[W/kg] |
|---:|---:|
| 95 | 2750 |
| 93 | 2830 |
| 90 | 3000 |
| 86 | 3100 |
| 84 | 3110 |
| 82 | 3150 |
| 80 | 3200 |
| 78 | 3100 |
| 76 | 3000 |
| 73 | 2750 |
| 70 | 2550 |
| 65 | 2500 |
| 60 | 2450 |
| 55 | 2400 |
| 50 | 2400 |
| 47 | 2350 |
| 44 | 2300 |
| 42 | 2250 |
| 40 | 2200 |
| 38 | 2250 |
| 36 | 2400 |
| 34 | 2450 |
| 33 | 2470 |
| 32 | 2500 |
| 31 | 2550 |
| 30 | 2600 |
| 29 | 2550 |
| 28 | 2500 |
| 27 | 2300 |
| 26 | 2250 |
| 24 | 2200 |
| 22 | 2000 |
| 21 | 1900 |
| 20 | 1800 |
| 19 | 1900 |
| 18 | 1950 |
| 16 | 2100 |

[Fig. 5]
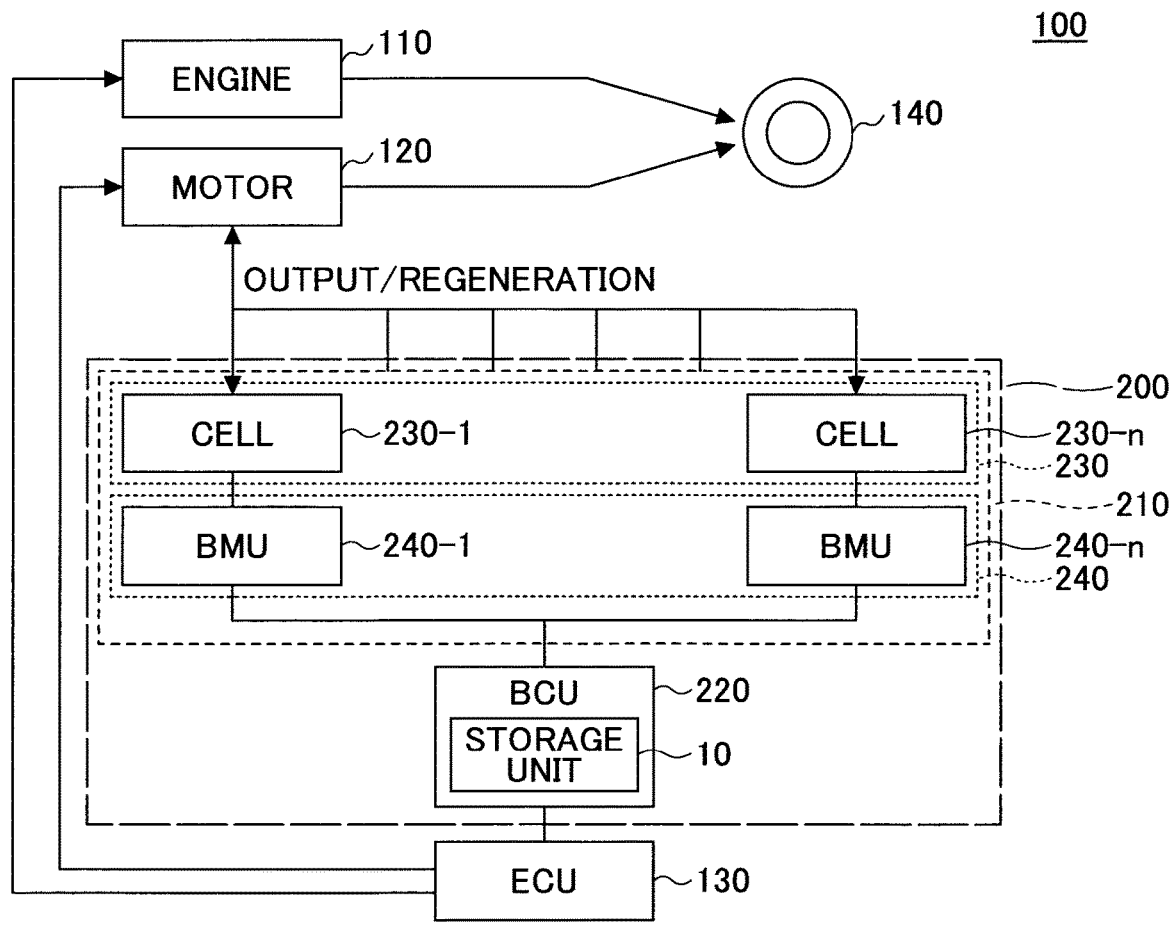
[Fig. 6]
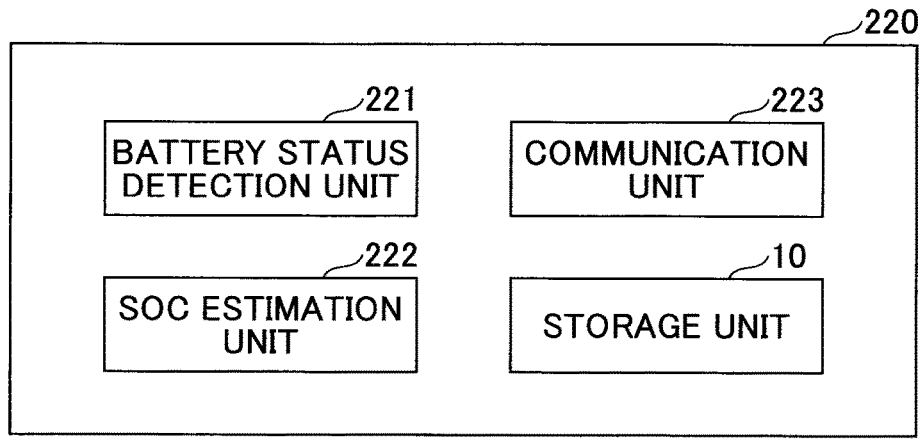

[Fig. 7A]
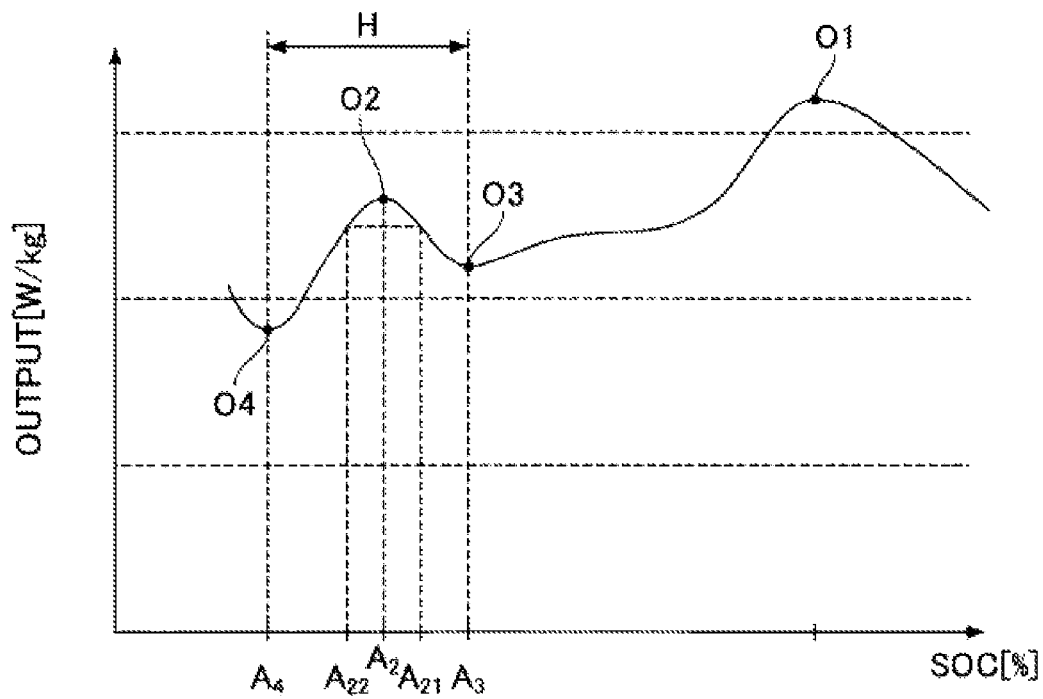
[Fig. 7B]
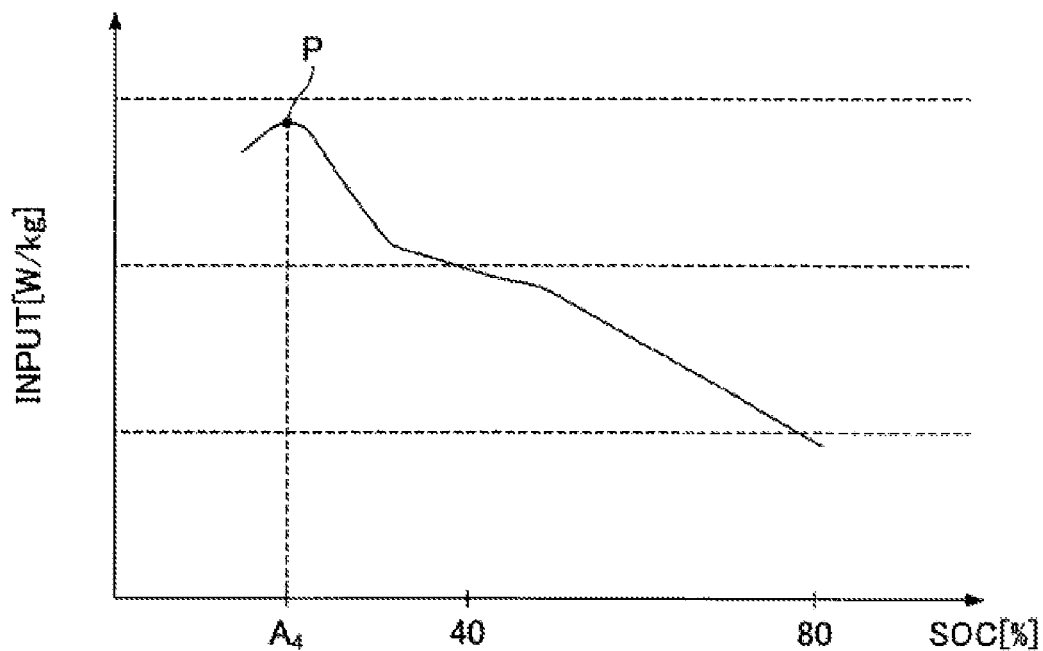

[Fig. 8]
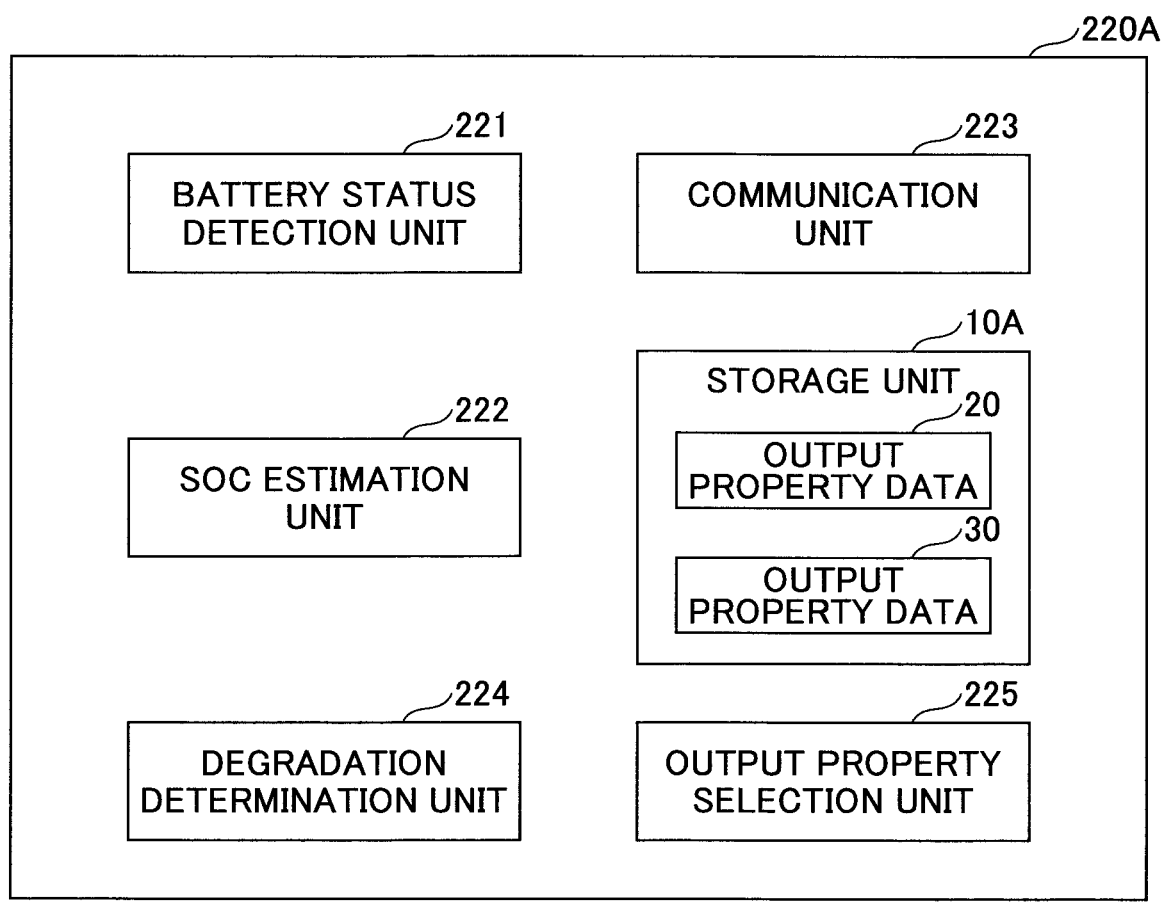

[Fig. 9]
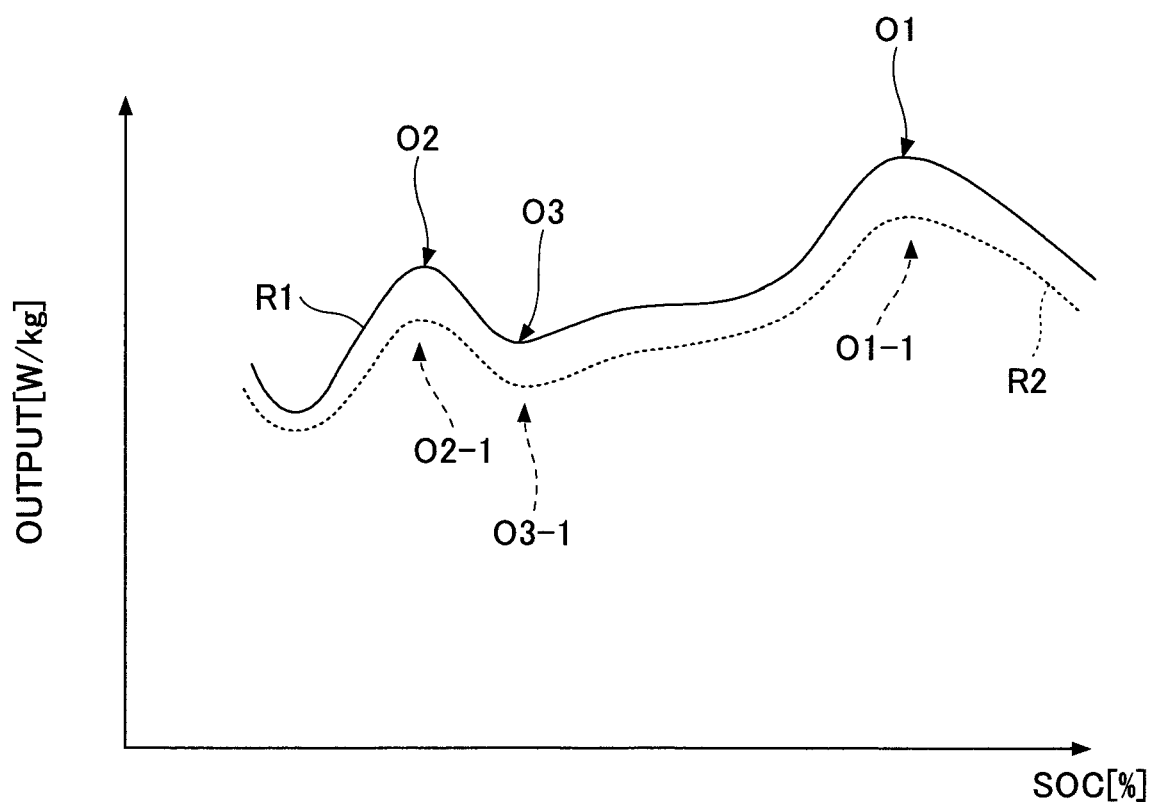

[Fig. 10]
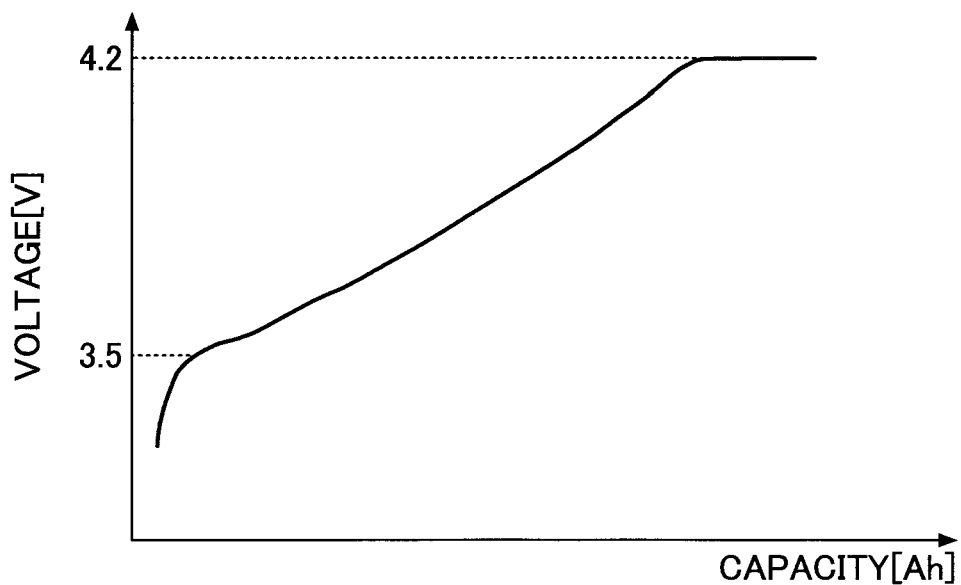
[Fig. 11]
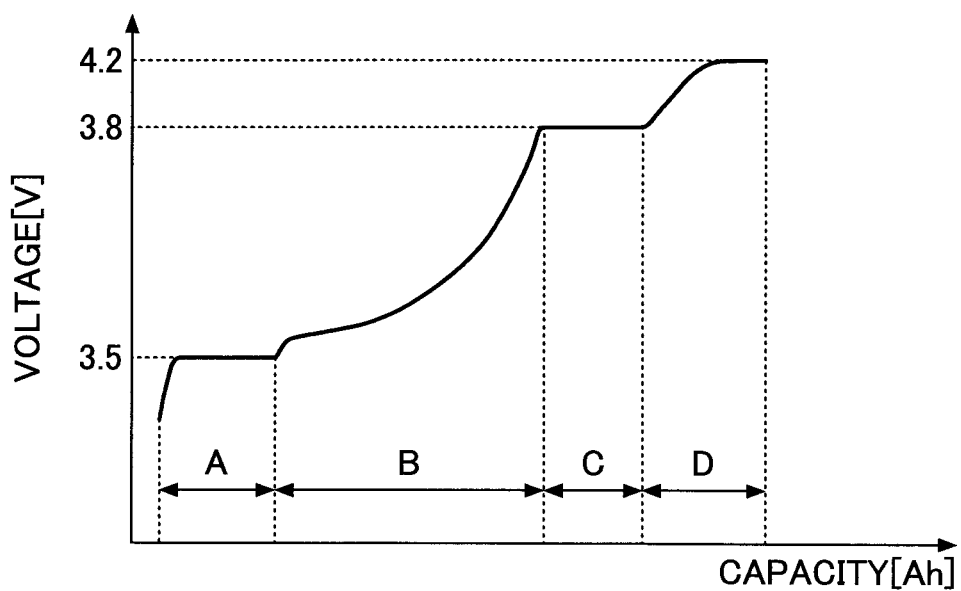

[Fig. 12]
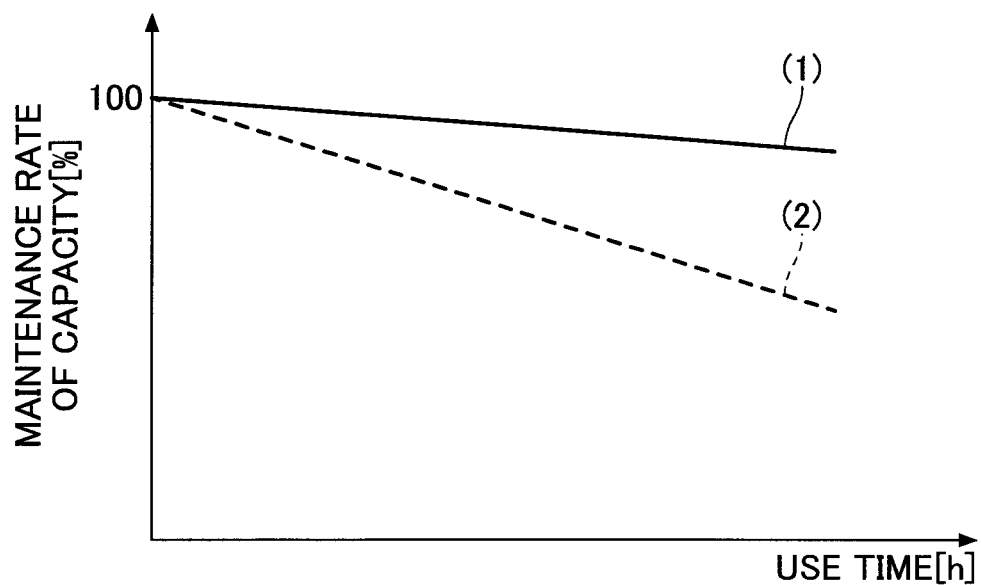
[Fig. 13]
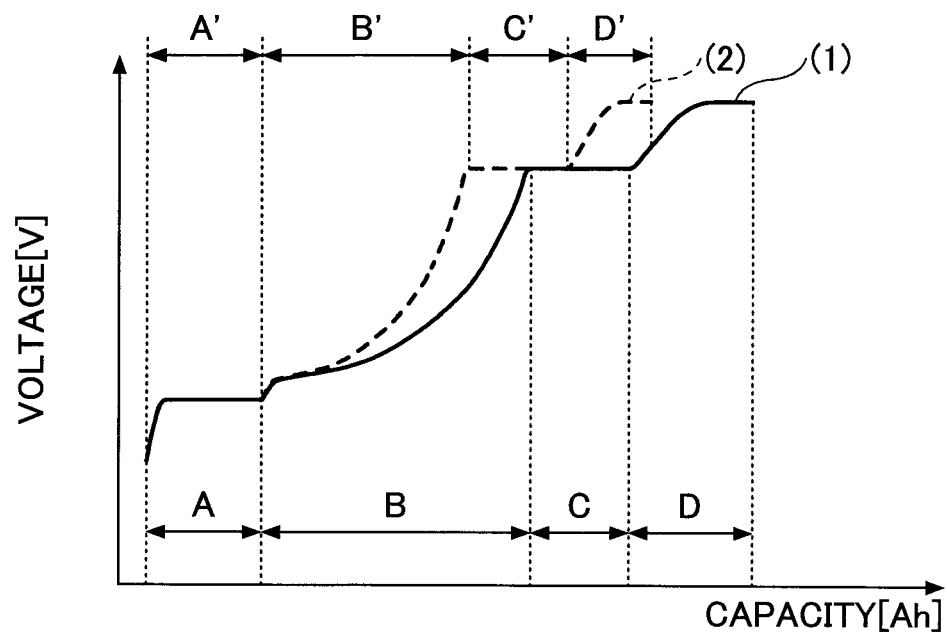

[Fig. 14]
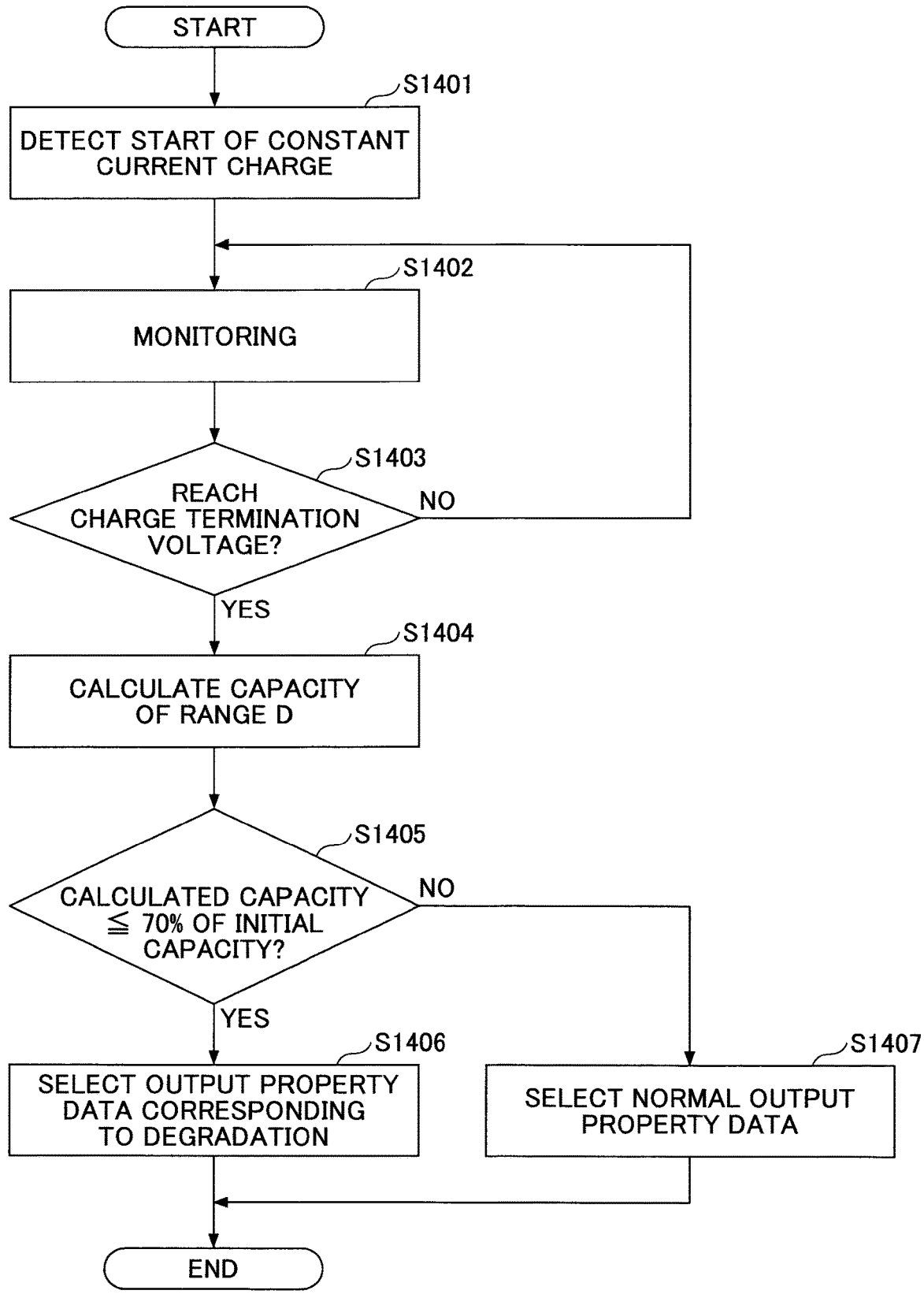

[Fig. 15]
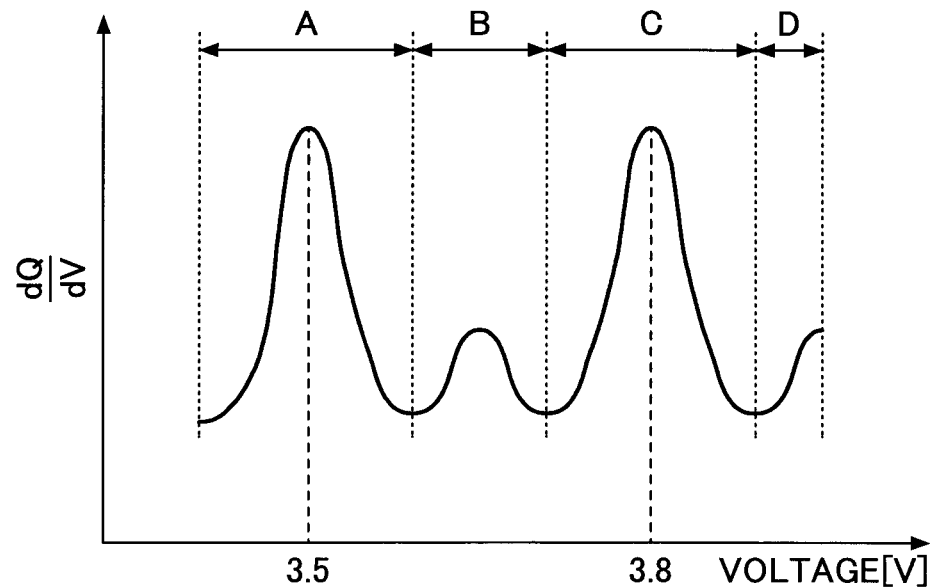
[Fig. 16]
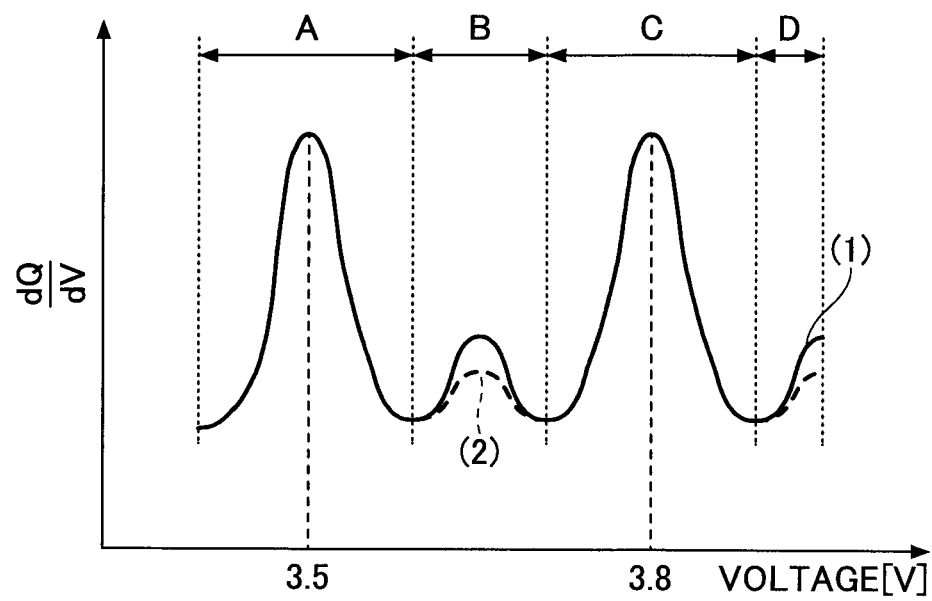

[Fig. 17]
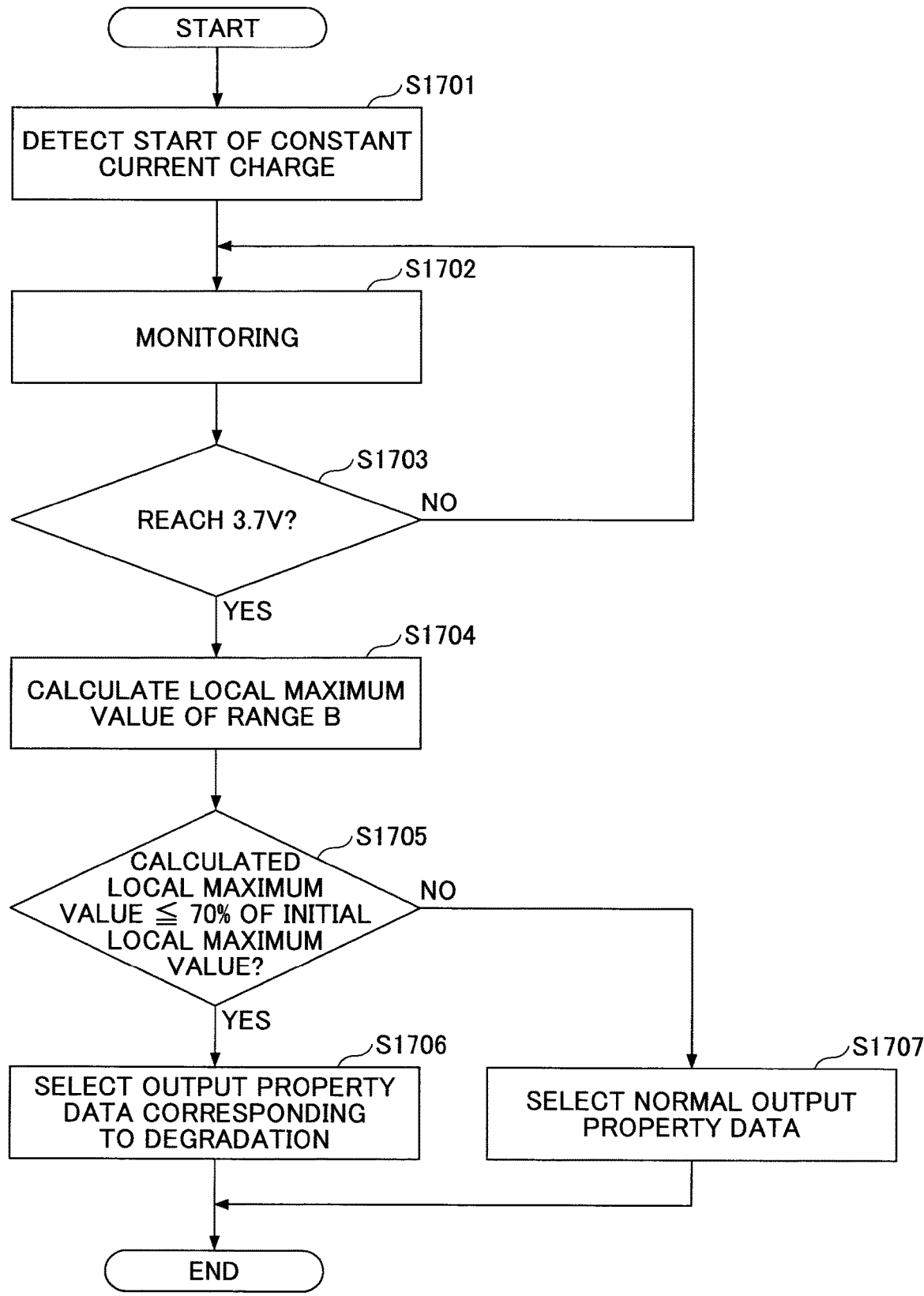

[Fig. 18]
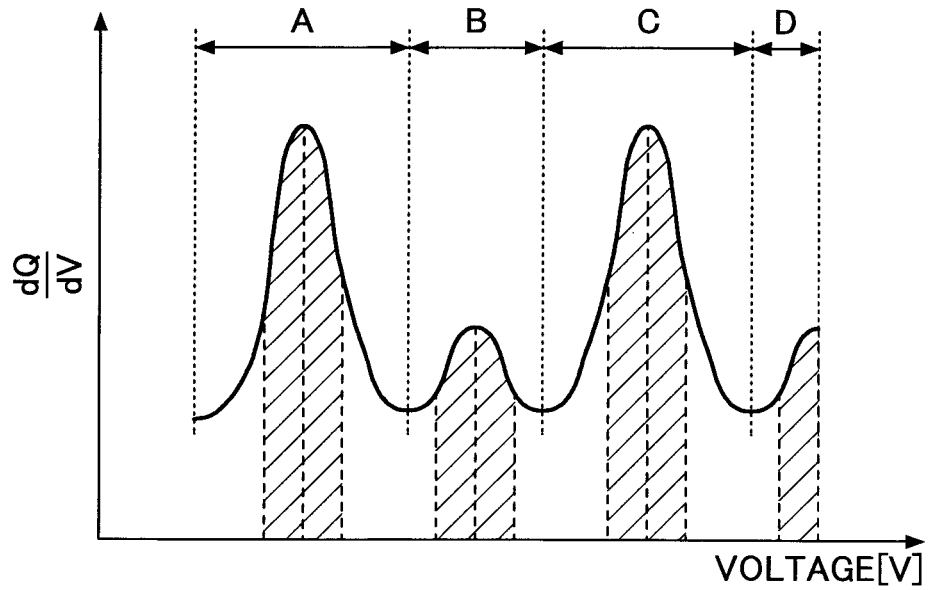
[Fig. 19]
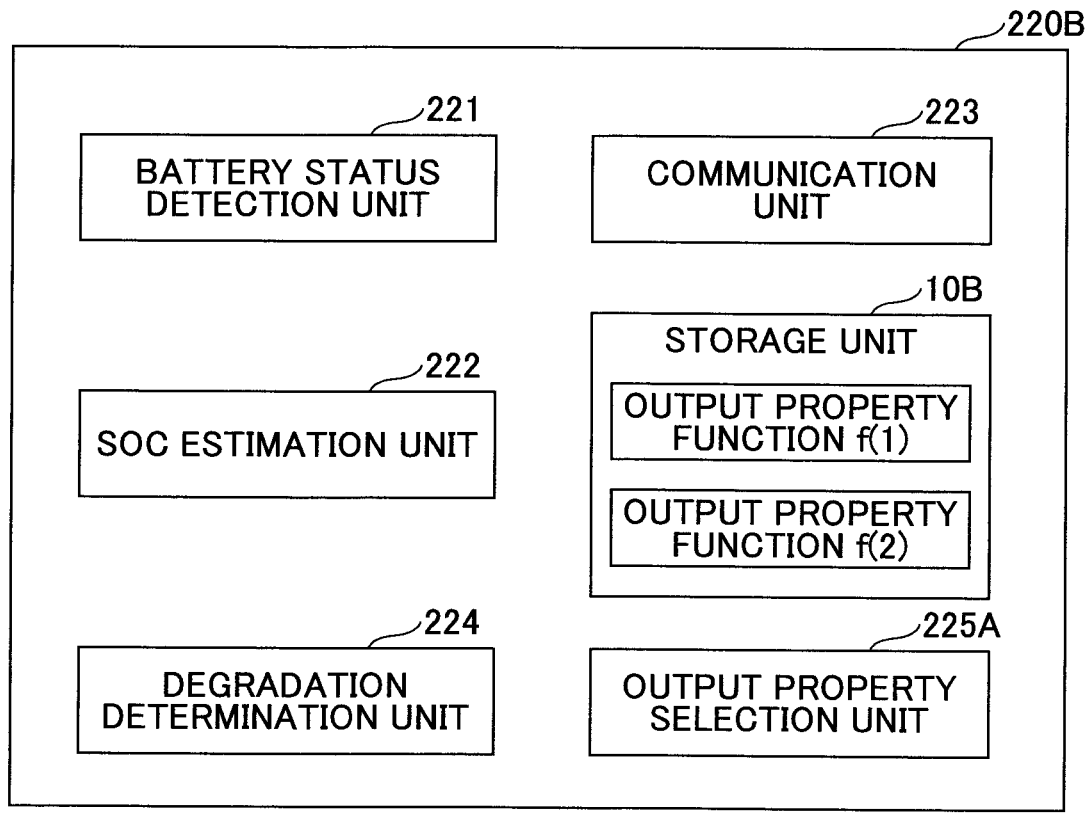

STORAGE APPARATUS, CONTROL APPARATUS, AND MOVING BODY

TECHNICAL FIELD

The present invention relates to a storage apparatus, a control apparatus, and a moving body.

BACKGROUND ART

A hybrid automobile that can charge a secondary battery such as a lithium ion battery and a nickel hydride battery is known in the related art.

It is also known in the related art that the hybrid automobile has an electric vehicle (EV) mode in which only power of the secondary battery is used to drive the hybrid automobile and a hybrid electric vehicle (HEV) mode in which both power of an engine and the power of the secondary battery are used to drive the hybrid automobile.

CITATION LIST

Patent Literature

[PTL 1] Japanese Patent No. 5624333

SUMMARY OF INVENTION

Technical Problem

In the conventional hybrid automobile, an output of the secondary battery is decreased in accordance with a decrease of a residual capacity of the secondary battery. Therefore, in the HEV mode for example, the more the residual capacity of the secondary battery decreases, the greater a ratio of the power (motivity) that the engine supplies becomes. As a result, there is a likelihood that a reduction of a fuel consumption amount per unit distance is prevented.

Further, in the conventional hybrid automobile, in a case in which the secondary battery is maintained in a large residual capacity state in order to reduce the fuel consumption amount per unit distance, there is a likelihood that degradation of the secondary battery proceeds and a lifetime of the secondary battery becomes shorter.

An object of the present disclosure is to reduce the fuel consumption amount per unit distance and to prevent the degradation of the secondary battery.

Solution to Problem

An embodiment provides a storage apparatus for storing output property data including groups of residual capacities of a secondary battery and output densities corresponding to the residual capacities. In the output property data, both a difference between a residual capacity of a group that includes an extreme value in the output densities and a residual capacity of a group that includes an output density that immediately precedes the extreme value, and a difference between the residual capacity of the group that includes the extreme value in the output densities and a residual capacity of a group that includes an output density that immediately follows the extreme value, are less than a difference between output densities of other groups adjacent to each other.

An embodiment also provides a control apparatus for controlling a moving body. The control apparatus includes a storage apparatus configured to store output property data including groups of residual capacities of a secondary battery and output densities corresponding to the residual capacities; and a control unit configured to control, in accordance with the output property data, movements of the moving body including an engine and a rotation shaft to be driven by electric power supplied from the secondary battery. In the output property data, both a difference between a residual capacity of a group that includes an extreme value in the output densities and a residual capacity of a group that includes an output density that immediately precedes the extreme value, and a difference between the residual capacity of the group that includes the extreme value in the output densities and a residual capacity of a group that includes an output density that immediately follows the extreme value, are less than a difference between output densities of other groups adjacent to each other.

Advantageous Effects of Invention

According to the present disclosure, the fuel consumption amount per unit distance can be reduced and the degradation of the secondary battery can be prevented.

BRIEF DESCRIPTION OF DRAWINGS

FIG. 1 is a drawing illustrating relation between a moving body and a storage unit of a first embodiment;

FIG. 2 shows a graph illustrating a SOC-output property of an ordinary lithium-ion battery;

FIG. 3 shows a graph illustrating a SOC-output property of a secondary battery of the first embodiment;

FIG. 4 is a table illustrating an example of output property data of the first embodiment;

FIG. 5 is a schematic diagram illustrating a configuration of the moving body of the first embodiment;

FIG. 6 is a block diagram illustrating a functional configuration of a BCU 220 of the first embodiment;

FIG. 7A illustrates a SOC-output property of the secondary battery;

FIG. 7B illustrates a SOC-input property of the secondary battery;

FIG. 8 is a block diagram illustrating a functional configuration of a BCU of a second embodiment;

FIG. 9 shows a graph illustrating output property data of the second embodiment;

FIG. 10 shows a graph illustrating an example of a charging property of the ordinary lithium-ion battery;

FIG. 11 shows a graph illustrating a charging property of the secondary battery of the second embodiment;

FIG. 12 shows a graph illustrating deterioration rates of active materials;

FIG. 13 shows a graph of the second embodiment illustrating the charging property of the secondary battery before being degraded and the charging property of the secondary battery after being degraded;

FIG. 14 is a flowchart illustrating selection of the output property data by the BCU of the second embodiment;

FIG. 15 shows a graph illustrating a voltage-differential quantity property of the secondary battery of a third embodiment FIG. 16 shows a graph of the third embodiment illustrating the voltage-differential quantity property of the secondary battery before being degraded and the voltage-differential quantity property of the secondary battery after being degraded;

FIG. 17 is a flowchart illustrating the selection of the output property data by the BCU 220A of the third embodiment FIG. 18 shows a graph illustrating calculation of capacities of respective ranges using the voltage-differential quantity property; and FIG. 19 is a block diagram illustrating a functional configuration of a BCU of a fourth embodiment.

DESCRIPTION OF EMBODIMENTS

First Embodiment

Hereinafter, embodiments of the present invention will be described with reference to accompanying drawings. FIG. 1 is a drawing illustrating relation between a moving body 100 and a storage unit 10 of a first embodiment.

The moving body 100 of the first embodiment includes a secondary battery as a source of electricity. Specifically, the moving body 100 of the first embodiment may be a Hybrid Electric Vehicle (HEV) or a Plug-in Hybrid Electric Vehicle (PHEV) for example.

The storage unit 10 of the first embodiment is disposed in a Battery Control Unit (BCU) that manages status of the secondary battery mounted on the moving body 100. For example, the storage unit 10 of the first embodiment may be a non-volatile memory included in the BCU. Details of the BCU will be described later.

The storage unit 10, as an example of a storage apparatus of the first embodiment, stores output property data 20 of the secondary battery. The secondary battery of the first embodiment is mounted on the moving body 100, and supplies electricity to the moving body 100. Movements of the moving body 100 of the first embodiment are controlled based on the output property data 20 of the secondary battery stored in the storage unit 10.

In the following, the output property data 20 of the first embodiment will be described. FIG. 2 shows a graph illustrating a SOC-output property of an ordinary lithium-ion battery. FIG. 3 shows a graph illustrating a SOC-output property of the secondary battery of the first embodiment. In FIG. 2 and FIG. 3, an ordinate indicates an output density and an abscissa indicates a state of charge (SOC). The SOC of the first embodiment is a value that represents a residual capacity of the secondary battery, and is a value that expresses, by a rate, a charged electrical quantity with respect to a rated electrical capacity of the secondary battery.

As shown in FIG. 2, in the ordinary lithium-ion battery, the output density has a property of monotonic decrease, in which the output density is high on a high SOC side and low on a low SOC side.

On the other hand, as shown in FIG. 3, the output property of the secondary battery of the first embodiment includes two local maximum values O1, O2 and a local minimum value O3 in the outputs.

When relation between the outputs and the SOC values is expressed by a continuous function f(x) for example, the local maximum value in the first embodiment is a value of the function f(x) at which the function f(x) changes from increase to decrease. Further, the local minimum value in the first embodiment is a value of the function f(x) at which the function f(x) changes from decrease to increase.

In the output property of the first embodiment, a SOC value corresponding to the local maximum value O1 is greater than a SOC value corresponding to the local minimum value O3, and the SOC value corresponding to the local minimum value O3 is greater than a SOC value corresponding to the local maximum value O2. In the first embodiment, the SOC value corresponding to the local maximum value O2 is about 30%.

That is, the battery of the first embodiment includes the output property in which the output becomes the local maximum value O2 even when the SOC is in a low range.

The output property data 20 stored in the storage unit 10 of the first embodiment represents the output property shown in FIG. 3 by aggregation of groups (records) of SOC values and output densities corresponding to the SOC values. A method for obtaining the output property data in the first embodiment will be described later.

In the following, the output property data 20 will be described with reference to FIG. 4. FIG. 4 is a table illustrating an example of the output property data 20 in the first embodiment.

As shown in FIG. 4, in the output property data 20 of the first embodiment, SOC values (residual capacities) and output densities corresponding to the SOC values are associated. In other words, the SOC values are associated in one-to-one correspondence with the residual capacities. In FIG. 4, the groups of the SOC values and the output densities are arranged in ascending order of the SOC values.

Further, according to the output property data 20 of the first embodiment, the number of records in a first range, which includes the SOC value corresponding to the local maximum value O1, the number of records in a second range, which includes the SOC value corresponding to the local maximum value O2, and the number of records in a third range, which includes the SOC value corresponding to the local minimum value O3 are greater than the number of records in other ranges, in the SOC values of the output property shown in FIG. 3.

Specifically, in the output property data 20 of the output property of the first embodiment, for example, in a case in which the SOC value corresponding to the local maximum value O1 is 80%, the number of records within the first range of ±5% from its center value (SOC 80%) is greater than the number of records in other ranges.

In the output property data 20 shown in FIG. 4, the number of records between the SOC value 80% to 85% is 3. On the other hand, the number of records between the SOC value 85% to 90% is 2.

Similarly, in a case in which the SOC value corresponding to the local maximum value O2 is 30% and the SOC value corresponding to the local minimum value O3 is 40%, the number of records within the second range of ±5% from its center value (SOC 30%) and the number of records within the third range of ±5% from its center value (SOC 40%) are greater than the number of records in the other ranges.

In the output property data 20 shown in FIG. 4, the number of records in the second range (between the SOC value 25% to 35%) is 9. Further, in the output property data 20, the number of records with in the third range (between the SOC value 35% to 45%) is 5. On the other hand, the number of records between the SOC value 45% to 55% is 3 in the output property data 20.

That is, the output property data 20 of the first embodiment represents in more detail the output property in the vicinities of the SOC values corresponding to the local maximum value O1, the local maximum value O2, and the local minimum value O3 than the output property of a range in which the output densities monotonically increase.

This is to focus on SOC values equal to and less than the SOC value corresponding to the local minimum value O3 in the control of the moving body 100, which will be described later, in the first embodiment. In the control, it is preferable to represent relation between the more detailed SOC values and the output densities in the vicinities of the SOC values corresponding to the local maximum value O1, the local maximum value O2, and the local minimum value O3.

Especially, in the output property data 20 of the first embodiment, it is preferable to represent the relation between the more detailed SOC values and the output densities in the vicinity of the SOC value corresponding to the local maximum value O2.

In other words, in the output property data 20 of the first embodiment, both a difference between the SOC value in the record whose output density is the local maximum value O2 and a SOC value in a record whose output density that immediately precedes the local maximum value O2 and a difference between the SOC value in the record whose output density is the local maximum value O2 and a SOC value in a record whose output density that immediately follows the local maximum value O2 are less than a difference between SOC values included in other two records (two records adjacent each other).

It should be noted that details will be described later of a reason why the SOC values equal to and less than the SOC value corresponding to the local minimum value O3 are focused on in the control of the moving body 100.

In the output property data 20 shown in FIG. 4, the SOC value of the record including the local maximum value O2 is 30%. Further, in the output property data 20, both the output density that immediately precedes the local maximum value O2 and the output density that immediately follows the local maximum value O2 are 2550. Further, a SOC value of the record including the output density that immediately precedes the local maximum value O2 is 29% and a SOC value of the record including the output density that immediately follows the local maximum value O2 is 31%. Therefore, both the difference between the SOC value of the record including the local maximum value O2 and the SOC value of the record including the output density that immediately precedes the local maximum value O2 and the difference between the SOC value of the record including the local maximum value O2 and the SOC value of the record including the output density that immediately follows the local maximum value O2 are 1%.

On the other hand, in the vicinity of the local maximum value O1 for example, the SOC value of the record including the local maximum value O1 is 80%. Further, in the output property data 20, an output density that immediately precedes the local maximum value O1 is 3100, and an output density that immediately follows the local maximum value O1 is 3150. The SOC value of the record including the output density that immediately precedes the local maximum value O1 is 78%, and the SOC value of the record including the output density that immediately follows the local maximum value O1 is 82%. Therefore, both a difference between the SOC value of the record including the local maximum value O1 and the SOC value of the record including the output density that immediately precedes the local maximum value O1 and, a difference between the SOC value of the record including the local maximum value O1 and the SOC value of the record including the output density that immediately follows the local maximum value O1 are 2%.

That is, in the output property data 20 of the first embodiment, in a case in which a difference between a SOC value included in a target record and a SOC value included in a record that immediately precedes the target record and a difference between the SOC value included in the target record and a SOC value included in a record that that immediately follows the target record are calculated, these differences become smallest when the target record is the record including the local maximum value O2.

In other words, these differences are smaller than differences of SOC values included in adjacent records, which are records other than the record including the local maximum value O2 of the output property data 20.

Further, in the output property of the secondary battery according to the first embodiment, the number of records within a part in which the output densities monotonically increase is smallest, and the number of records within a part including the local maximum value and the number of records within a part including the local minimum value are larger. Accordingly, in comparison with a memory capacity of a configuration in which the number of records is uniformly large over the entire range of the SOC values, it becomes possible to reduce a memory capacity of the storage unit 10 necessary for storing the output property data 20 according to the first embodiment. In other words, in the output property data 20 stored in the storage unit 10 of the first embodiment, the number of records within the range in which the output densities monotonically increase is reduced in order to reduce the memory capacity used to store the output property data 20.

According to the first embodiment, by mounting the secondary battery including the above described output property data 20 on the moving body 100, the moving body 100 can be controlled utilizing the output property of the secondary battery.

Specifically, even when the SOC is decreased, the secondary battery of the first embodiment can supply the local maximum value O2, which is higher output than that of the ordinary lithium-ion battery. Thus, according to the first embodiment, a rate of power (motivity), necessary for driving the moving body 100, that an engine supplies can be reduced. In this way, according to the first embodiment, a fuel consumption amount per unit distance in the moving body 100 can be reduced. Further, according to the first embodiment, the local maximum value O2 can be obtained as the output even when the secondary battery is not maintained in a high SOC state. Thus, it is not required to maintain the secondary battery in the high SOC state at all times, and degradation (deterioration) of the secondary battery can be prevented.

It should be noted that for example, the output property data 20 shown in FIG. 4 is output property data corresponding to a temperature, 25 degrees Celsius (° C.), of a thermocouple provided on a package surface or within the secondary battery. The storage unit 10 of the first embodiment stores output property data corresponding to a temperature other than 25 degrees Celsius.

Further, although the number of extreme values (local maximum value, local minimum value), at which the output changes from increase to decrease or changes from decrease to increase, included in the output property shown in FIG. 3 is 3, the number of extreme values in the output property of the secondary battery is not limited to 3. The number of extreme values in the output property of the secondary battery may vary depending on a combination of materials of the secondary battery, for example. Thus, the number of extreme values in the output property may be an arbitrary number. In a case in which the number of extreme values in the output property is the arbitrary number, one or more extreme values present in a side of low SOC are focused on and the output property data 20 is made such that the number of records in the vicinities of SOC values corresponding to the focused on extreme values is larger.

Here, a method for obtaining the output property data 20 of the first embodiment will be described.

The output property data 20 of the first embodiment is data of a result obtained by measuring output densities of the secondary battery of the first embodiment based on a testing method (standard number JEVS D713) for output densities and input densities of a sealed nickel-hydrogen battery for hybrid electric automobiles determined in the Japan Electric Vehicle Standard.

Specifically, in the measurement of the output property data, under specific charge status (SOC), voltage drops when discharge current pulses of current rates 1C, 2C, 3C, and 10C are applied for 10 seconds are measured. Then, the maximum output, when a straight line obtained by linear approximation of the measured voltage drops is dragged to the discharge termination voltage, is calculated. It should be noted a current value, at which discharging is finished when a secondary battery of a nominal capacity value is discharged at constant current for a predetermined time, is the current rate 1C.

Further, in the first embodiment, input densities of the secondary battery 230 can also be measured similarly by using the above described testing method. Specifically, under specific charge status (SOC), voltage rises when discharge current pulses of current rates 1C, 2C, 3C, and 10C are applied for 10 seconds are measured. Then, the maximum input, when a straight line obtained by linear approximation of the measured voltage rises is extrapolated to the discharge termination voltage, is calculated.

In the first embodiment, the output property data 20 can be obtained by evaluating, for each SOC value, an output density based on the above described testing method under a state of 25 degrees Celsius. Specifically, in the first embodiment, output densities are measured for the respective SOC values of the output property data 20 shown in FIG. 4 using the above described testing method.

Further, the storage unit 10 of the first embodiment includes output property data for different temperatures, other than 25 degrees Celsius, obtained by the similar measurement.

For example, at 10 degrees intervals from −30 degrees Celsius to 50 degrees Celsius, the storage unit 10 of the first embodiment may store output property data for each temperature such as output property data for −20 degrees Celsius, output property data for −10 degrees Celsius, and so on.

Next, the moving body 100 of the first embodiment will be described with reference to FIG. 5. FIG. 5 is a schematic diagram illustrating a configuration of the moving body 100 of the first embodiment.

The moving body 100 of the first embodiment includes an engine 110, a motor 120, an Electric Control Unit (ECU) 130, a rotation shaft 140, and a charge control apparatus 200. For example, the moving body 100 of the first embodiment may be a Hybrid Electric Vehicle (HEV) or a Plug-in Hybrid Electric Vehicle (PHEV).

The engine 110 is a known internal combustion engine using gasoline, light gas oil, or the like as a fuel. The motor 120 is a known generator motor functioning as both an electric motor and a generator. The motor 120 can be operated by electric power supplied from the secondary battery 230.

The ECU 130 is a computer (microcomputer) that comprehensively controls the engine 110, the motor 120, a Battery Control Unit (BCU) 220 and the like. Specifically, for example, the control by the ECU 130 of the first embodiment includes control of the motor 120, brake control and the like.

The rotation shaft 140 of the first embodiment is, for example, a driving shaft of tires that the moving body 100 includes. In the first embodiment, by rotating the rotation shaft 140 using the engine 110 and/or the motor 120, the moving body 100 is driven.

The charge control apparatus 200 of the first embodiment includes a battery pack 210 and the BCU 220. The BCU 220 of the first embodiment includes the storage unit 10. That is, the BCU 220 of the first embodiment includes (stores) the output property data 20.

The battery pack 210 of the first embodiment includes the secondary battery 230 and Battery Monitoring Units (BMU) 240.

The secondary battery 230 of the first embodiment is a rechargeable secondary battery. In the secondary battery 230 of the first embodiment, n cells (from a cell 230-1 to a cell 230-$n$) are connected. It should be noted that although the secondary battery 230 of the first embodiment includes the plurality of cells, the present invention is not limited to this. The secondary battery 230 may be one secondary battery cell.

The secondary battery 230 of the first embodiment has a role of supplying electric power when the motor 120 functions as the electric motor and a role of storing electric power generated by regeneration brake when the motor 120 functions as the electric generator.

Further, in the first embodiment, in a case in which the moving body 100 is the PHEV, an external power source plug is provided. By plugging the external power source plug into an outlet, the secondary battery 230 of the first embodiment can be charged by electric power supplied from a commercial power source. Further, in the secondary battery 230 of the first embodiment, a plurality of thermocouples may be provided for the respective cells 230-1 to 230-$n$.

Further, in the first embodiment, n numbers of BMUs 240 are connected, from the BMU 240-1 to BMU 240-$n$ corresponding to the cell 230-1 to the cell 230-$n$. It should be noted that although the first embodiment includes the plurality of BMUs 240, the present invention is not limited to this. In some embodiment may include one BMU 240.

The BMUs 240 of the first embodiment have a function to monitor status of the secondary battery 230. For example, the BMUs 240 include a voltage sensor, a current sensor, and/or the like. The BMUs 240 may detect a voltage of the secondary battery 230, charging current to the secondary battery 230, and discharging current from the secondary battery 230. Further, the BMUs 240 of the first embodiment may obtain a temperature of the secondary battery 230 from the thermocouple provided on the secondary battery 230.

The BCU 220 of the first embodiment obtains the temperature, the voltage, and the like of the secondary battery 230 from the BMUs 240 to control charge and discharge with respect to the secondary battery 230.

In the first embodiment, in order to cause the secondary battery 230 to have the output property shown in FIG. 3 and FIG. 4, for example, an electrode formed by mixing materials having different output properties relative to the battery voltage may be used in a positive electrode.

A specific example of the secondary battery 230 is a lithium-ion battery having a positive electrode formed by mixing lithium vanadium phosphate having a basic skeleton of $Li_3V_2(PO_4)_3$ or an analogous compound (hereinafter, referred to as lithium vanadium phosphate) formed by denaturing a part of the structure of lithium vanadium phosphate with a ternary material (nickel, cobalt, aluminum, or the like). Although it is difficult to increase capacity (energy density) of lithium vanadium phosphate alone (for example, 100 Wh/kg or greater), lithium vanadium phosphate is a material advantageous in increasing the output. The ternary material is advantageous in increasing the capacity (energy density). The material of a negative electrode is, for example, graphite or the like.

Next, the BCU 220 of the first embodiment will be described with reference to FIG. 6. FIG. 6 is a block diagram illustrating a functional configuration of the BCU 220 of the first embodiment.

The BCU 220 of the first embodiment includes the storage unit 10, a battery status detection unit 221, a SOC estimation unit 222, and a communication unit 223.

The battery status detection unit 221 of the first embodiment continuously detects the voltage of the secondary battery 230 based on the status monitored by the BMUs 240. Further, the battery status detection unit 221 of the first embodiment can obtain charging current to the secondary battery 230, discharging current from the secondary battery 230, and the temperature of the secondary battery 230 from the BMUs 240.

The SOC estimation unit 222 of the first embodiment obtains the voltage and the temperature, obtained by the battery status detection unit 221 via the BMUs 240, of the secondary battery 230 and estimates a SOC value based on the voltage and the temperature of the secondary battery 230. In other words, the SOC estimation unit 222 can estimate a residual capacity of the secondary battery 230 based on the output property data 20 and the status of the secondary battery 230 detected by the battery status detection unit 221. Then, the SOC estimation unit 222 reads the output property data 20 stored in the storage unit 10 to estimate the present output of the secondary battery 230 based on the estimated SOC value and the output property data 20. It should be noted that the SOC estimation unit 222 of the first embodiment reads the output property data 20 corresponding to a temperature detected as the temperature of the secondary battery 230.

The ECU 130 of the first embodiment receives, via the communication unit 223, the output estimated by the SOC estimation unit 222 based on the output property data 20, and controls movements of the moving body 100 in accordance with the received output. In other words, the ECU 130 can control the movements of the moving body 100, which includes the engine 110 and the rotation shaft 140 to be driven by electric power supplied from the secondary battery 230, in accordance with the output property data 20. Further, the ECU 130 can control (actuate) the moving body 100 in accordance with the SOC value (residual capacity) estimated by the SOC estimation unit 222.

Thus, in the first embodiment, the ECU 130 can utilize the output property of the secondary battery 230 and can use the secondary battery 230 as a supply source of electricity even when a SOC value of the secondary battery 230 is in a low range. Therefore, according to the first embodiment, a rate of electricity (power), necessary for driving the moving body 100, that the engine 110 supplies can be reduced, and a fuel consumption amount per unit distance in the moving body 100 can be reduced.

Further, in the first embodiment, because the electricity can be supplied from the secondary battery 230 within a range in which the SOC values are low, the secondary battery 230 can be maintained in a state of low SOC. Therefore, according to the first embodiment, degradation of the secondary battery 230 can be prevented. It should be noted that the range in which SOC values are low is, for example, a range in which SOC values are equal to or less than 50%.

Next, with reference to FIGS. 7A and 7B, a reason will be described why the SOC values equal to and less than the SOC value corresponding to the local minimum value O3 are focused on in the control of the moving body 100. FIGS. 7A and 7B illustrate a property of the secondary battery 230 of the first embodiment. FIG. 7A illustrates a SOC-output property of the secondary battery 230. FIG. 7B illustrates a SOC-input property in the regeneration operation of the secondary battery 230.

At first, the SOC-output property of the secondary battery 230 will be described. As described in FIG. 3, the secondary battery 230 of the first embodiment has an output property where an output on a side of low SOC is higher than an output on a part of a side of high SOC. For example, an output in the vicinity of the local maximum value O2 is relatively high.

Specifically, in the SOC-output property of the secondary battery 230 of the first embodiment, an output corresponding to a predetermined SOC value $A_3$ is the local minimum value O3, and an output corresponding to a predetermined residual capacity smaller than the SOC corresponding to the local minimum value O3 becomes the local maximum value O2. Further, in the SOC-output property of the secondary battery 230 of the first embodiment, an output corresponding to a predetermined SOC value $A_4$ smaller than the value $A_3$ is a local minimum value O4, which is a second local minimum value smaller than the local minimum value O3 (first local minimum value).

That is, the secondary battery 230 of the first embodiment has the first local minimum value O3 and the second local minimum value O4 in the SOC-output property. The second local minimum value O4 is smaller than the local minimum value O3, and the SOC value $A_4$ corresponding to the second local minimum value O4 is smaller than the SOC value $A_3$ corresponding to the first local minimum value O3. Further, the SOC value $A_4$ corresponding to the second local minimum value O4 is smaller than the SOC value $A_2$ corresponding to the local maximum value O2.

Next, a SOC-input property of the secondary battery 230 of the first embodiment will be described. As shown in FIG. 7B, energy input into the secondary battery 230 of the first embodiment increases as the SOC value drops until the SOC value becomes the predetermined value $A_4$.

Therefore, the most energy is input in the secondary battery 230 of the first embodiment when the SOC has the value $A_4$. In other words, the secondary battery 230 is most effectively charged when the SOC is near the value $A_4$.

Thus, when the SOC value becomes equal to or smaller than the value $A_4$, the BCU 220 of the first embodiment stops the output from the secondary battery 230 and starts the regeneration operation to charge the secondary battery 230. The BCU 220 prohibits the output of the secondary battery 230 and only performs the charge by the regeneration operation until the SOC value of the secondary battery 230 becomes the value $A_3$. Then, the BCU 220 permits the output from the secondary battery 230 when the SOC value of the secondary battery 230 is equal to or greater than the value $A_3$.

According to the first embodiment, by controlling the charge and discharge of the secondary battery 230 as described above, the charge is started when the SOC value of the secondary battery 230 becomes a value enabling the most efficient charge.

In the situation where the SOC value drops to the value $A_4$, there is a possibility that the residual SOC is completely used depending on usage status of the secondary battery 230. Therefore, in this situation, it is preferable to charge as quickly as possible so as to increase the SOC value of the secondary battery 230.

In the secondary battery 230 of the first embodiment, the energy input in the secondary battery 230 increases when the SOC value drops. When the SOC value drops to be the value $A_4$, the input energy becomes the maximum value P.

Thus, in the first embodiment, when the SOC value drops to the value $A_4$, the output of the secondary battery 230 is stopped, and the charge of the secondary battery 230 is started by the regeneration operation. In the first embodiment, the output of the secondary battery 230 is permitted when the SOC value of the secondary battery 230 becomes the value $A_3$. It should be noted that although the charge may be stopped when the output from the secondary battery 230 is permitted, the charge does not have to be stopped.

In the following, a reason why the output of the secondary battery 230 is permitted when the SOC value of the secondary battery 230 becomes the value $A_3$ will be described.

In the first embodiment, as shown in FIG. 7A, the output increases along with a decrease of the SOC value after the output of the secondary battery 230 becomes the local minimum value O3. Therefore, the output of the secondary battery 230 greater than the local minimum value O3 is obtainable when the SOC value increases or decreases from the value $A_3$.

In this case, in comparison with obtaining a high output by charging the secondary battery 230 to increase the SOC value, it is effective to obtain an output equivalent to the high output by continuing the output from the secondary battery 230 so as to decrease the SOC value in consideration with electricity for the charge, heat generation and degradation of the secondary battery 230 caused by the increase of the SOC. Thus, according to the first embodiment, the output of the secondary battery 230 is permitted when the SOC value of the secondary battery 230 becomes the value $A_3$. In other words, when the SOC value (residual capacity) of the secondary battery 230 becomes a predetermined value in a range H from the SOC value $A_4$ corresponding to the local minimum value O4 to the SOC value $A_3$ corresponding to the local minimum value O3, the ECU 130 may start the output from the secondary battery 230 to supply the electric power to the rotation shaft 140. More specifically, the ECU 130 may permit the output from the secondary battery 230 when the SOC value (residual capacity) becomes the predetermined value that is greater than the SOC value $A_4$ and equal to or less than the SOC value $A_3$.

Because the BCU 220 of the first embodiment controls the secondary battery 230 as described above, it is preferable that the output property data 20 represents the relation between the detailed SOC values and the output densities especially in the vicinities of the SOC values corresponding to the extreme values within the range H.

Thus, the output property data 20 of the first embodiment represents in detail, in the vicinity of the SOC corresponding to the local maximum value O2, in the vicinity of the SOC corresponding to the local minimum value O3, and in the vicinity of the SOC corresponding to the local minimum value O4, the relation of the SOC values and the output densities.

In the first embodiment, a time period in which the SOC value of the secondary battery 230 is maintained in the range H from the value $A_3$ through the value $A_4$ can be prolonged by using the output property data 20 to control the output from the secondary battery 230.

In the range H of the first embodiment, the local maximum value O2 is included and an output equivalent to the output corresponding to the SOC value of about 70% is obtainable. Further, in the range H of the first embodiment, the energy input by the regeneration operation is greater than that of the side of the SOC higher than the range H so as to enable a quick charge.

Therefore, in the first embodiment, by using the secondary battery 230 in the range H, the SOC value is quickly recovered to the value $A_3$ in a case in which the SOC value becomes equal to or smaller than the value $A_4$. Further, when the SOC value becomes equal to greater than the value $A_3$, a high output is obtainable while maintaining the low SOC value by stopping the charge and by starting the output from the secondary battery 230.

It should be noted that in the first embodiment, in a case in which an output greater than the local maximum value O2 is required when the SOC of the secondary battery 230 is in the range H, the engine may be used to assist the output.

Meanwhile, in the ordinary lithium-ion battery, the SOC-output property has a tendency of a monotonic decrease where the output decreases along with the decrease of the SOC, and a relationship between the SOC value at which the output from the lithium-ion battery is stopped and the SOC value at which the output from the lithium-ion battery is started is not considered.

In the first embodiment, by maintaining the SOC value of the secondary battery 230 having the above described SOC-output property and SOC-input property within the range H, a higher output than an output of the ordinary lithium-ion battery can be obtained in a case where the secondary battery 230 having the same weight as that of the ordinary lithium-ion battery is mounted on a hybrid vehicle.

In the example shown in FIG. 7A, the range H is between the SOC value $A_3$ and the SOC value $A_4$. However, the range H is not limited thereto. The range H of the first embodiment may vary, for example, as long as the SOC value corresponding to the local maximum value O2 is included. Further, it is preferable that the range H of the first embodiment is present between the value $A_3$ and the value $A_4$.

Therefore, the range H of the first embodiment may be between the value $A_{21}$ and the value $A_{22}$, between the value $A_3$ and the value $A_{22}$, or between the value $A_{21}$ and the value $A_4$.

As described, according to the first embodiment, by using the secondary battery 230 under a state where the SOC is in the range H, the SOC of the secondary battery 230 can be maintained relatively low so as to restrict the heat generation and the degradation of the secondary battery 230. Further, according to the first embodiment, because the heat generation of the secondary battery 230 can be restricted, energy for cooling becomes unnecessary and the fuel consumption per unit distance can be reduced.

It should be noted that although the SOC value at which the output of the secondary battery 230 is permitted is the value $A_3$ in the first embodiment, the SOC value at which the output of the secondary battery 230 is permitted may be a value between the value $A_3$ and the value $A_2$ corresponding to the local maximum value O2.

Second Embodiment

Next, a second embodiment will be described with reference to FIGS. 8 to 14. The second embodiment differs from the first embodiment in that output property data in accordance with degradation (deterioration) of the secondary battery 230 is stored in a storage unit 10A of the second embodiment. In the following descriptions of the second embodiment, differences between the second embodiment and the first embodiment will be described. Similar reference numbers, used in the descriptions of the first embodiment, are given to elements of the second embodiment similar to the elements of the first embodiment, and their descriptions may be omitted as appropriate.

FIG. 8 is a block diagram illustrating a functional configuration of a BCU 220A of the second embodiment. The BCU 220A of the second embodiment includes the battery status detection unit 221, the SOC estimation unit 222, the communication unit 223, the storage unit 10A, a degradation determination unit 224, and an output property selection unit 225.

The storage unit 10A of the second embodiment stores the output property data 20 and output property data 30. The output property data 30 is output property data for degradation used to estimate the output of the secondary battery 230 by the SOC estimation unit 222 when the degradation determination unit 224 determines that the secondary battery 230 is degraded. Details of the output property data 30 will be described later.

The degradation determination unit 224 of the second embodiment determines whether the secondary battery 230 is in a degraded state. Details of the determination of the degradation by the degradation determination unit 224 will be described later.

The output property selection unit 225 instructs the SOC estimation unit 222 to select the output property data (second output property data) 30 when the degradation determination unit 224 determines that the secondary battery 230 is in the degraded state. Further, the output property selection unit 225 instructs the SOC estimation unit 222 to select the output property data (first output property data) 20 when the degradation determination unit 224 determines that the secondary battery 230 is not in the degraded state.

Next, the output property data 30 of the second embodiment will be described with reference to FIG. 9. FIG. 9 shows a graph illustrating output property data of the second embodiment.

In FIG. 9, a curved line R1 represented by a solid line is the output property of the secondary battery 230 shown in FIG. 3. The output property represented by the curved line R1 is an output property in a state in which the secondary battery 230 is not degraded. In FIG. 9, a curved line R2 represented by a broken line is an output property of the secondary battery 230 in a state in which the secondary battery 230 is degraded.

The output property data 20 of the second embodiment is aggregation of the groups (records) of the SOC values in the curved line R1 and the output values corresponding to the SOC values.

In the second embodiment, the output property data 30 is aggregation of the groups (records) of the SOC values in the curved line R2 and the output values corresponding to the SOC values.

It should be noted that the curved line R2 shown in FIG. 9 is an output property of the secondary battery 230 of a case in which a current capacity, calculated from the integration of current applied until the battery voltage becomes 4.2 V from 3.8 V, becomes equal to or less than 70% of a capacity similarly calculated in a state having the output property of the curved line R1, in the constant current charge to the secondary battery 230 for example.

Similar to the curved line R1, the curved line R2 includes a local maximum value O1-1, a local maximum value O2-1, and a local minimum value O3-1. In the curved line R2, a SOC value corresponding to the local maximum value O1-1 is greater than a SOC value corresponding to the local minimum value O3-1, and the SOC value corresponding to the local minimum value O3-1 is greater than a SOC value corresponding to the local maximum value O2-1. That is, relation between the SOC value corresponding to the local maximum value O1-1, the SOC value corresponding to the local maximum value O2-1, and the SOC value corresponding to the local minimum value O3-1 is similar to the relation between the SOC value corresponding to the local maximum value O1, the SOC value corresponding to the local maximum value O2, and the SOC value corresponding to the local minimum value O3.

In the second embodiment, the curved line R2 is acquired by measuring in advance the output property of the secondary battery 230 in the degraded state, and the aggregation of the groups (records) of the SOC values and the output values corresponding to the SOC values is extracted to obtain the output property data 30.

Similar to the output property data 20, the output property data 30 of the second embodiment represents the relation between the SOC values of the output densities in more detail in the vicinities of the SOC values corresponding to the local maximum value O1-1, the local maximum value O2-1, and the local minimum value O3-1.

That is, in the output property data 30, the number of records in a range of ±5% from its center value which is the SOC value corresponding to the local maximum value O1-1, the number of records in a range of ±5% from its center value which is the SOC value corresponding to the local maximum value O2-1, and the number of records in a range of ±5% from its center value which is the SOC value corresponding to the local minimum value O3-1, are greater than the number of records in other SOC 10% ranges.

Next, the determination of the degradation of the secondary battery 230 by the degradation determination unit 224 of the second embodiment will be described.

The degradation determination unit 224 of the second embodiment uses a charging property of the secondary battery 230 of the second embodiment to determine whether the secondary battery 230 is degraded without fully discharging the secondary battery 230.

In the following, the charging property of the secondary battery 230 of the second embodiment will be described. At first, a charging property of the ordinary lithium-ion battery is described before the charging property of the secondary battery 230 of the second embodiment is described.

FIG. 10 shows a graph illustrating an example of the charging property of the ordinary lithium-ion battery. In FIG. 10, an abscissa indicates a capacity (Ah) and an ordinate indicates a voltage (V) between terminals. FIG. 10 shows a constant current charge curved line.

The ordinary lithium ion battery uses, for example, NCA (nickel, cobalt, aluminum) as a cathode (positive electrode) active material. FIG. 10 shows the charging property in this case. As shown in FIG. 10, the capacity relatively and monotonously increases to the final voltage 4.2 V of the charge.

FIG. 11 shows a graph illustrating the charging property of the secondary battery 230 of the second embodiment. In FIG. 11, an abscissa indicates a capacity (Ah) and an ordinate indicates a voltage (V) between terminals. FIG. 11 shows a constant current charge curved line.

On the other hand, the secondary battery 230 of the second embodiment uses, as a cathode (positive electrode), an electrode in which active materials having different output properties with respect to the battery voltage are mixed. In this case, because the different materials do not make a chemical reaction though the different materials are mixed, exit and entry of ions at each voltage in charging and discharging appear in the charging property as a peculiar property of the materials.

For example, the secondary battery 230 of the second embodiment is a lithium-ion battery using an electrode formed by mixing lithium vanadium phosphate having a basic skeleton of $Li_3V_2(PO_4)_3$ or an analogous compound formed by denaturing a part of the structure of lithium vanadium phosphate with NCA. Further, the secondary battery 230 of the second embodiment uses graphite as an active material of a negative electrode for example.

In this case, as shown in FIG. 11, in the charging property of the secondary battery 230, ranges A to D appear. The ranges A and C are relatively flat. The ranges B and D have relatively large inclinations. The ranges A and C are ranges in which the property of lithium vanadium phosphate dominantly appears. On the other hand, the ranges B and D are ranges in which the property of NCA dominantly appears.

FIG. 12 shows a graph illustrating deterioration rates (degradation speeds) of the active materials. In FIG. 12, an abscissa indicates a used time (h) of the battery and an ordinate indicates a maintenance rate of the capacity.

Although there are various factors for the degradation, main factors are the number of cycles (uses), a temperature, an amount of charging/discharging current, and the like. Batteries are degraded by being used or by being stored in a fully charged state. Depending on types of active materials, a degree of the degradation varies. Some batteries have a large degree of the degradation, and other batteries have a small degree of the degradation. A straight line (1) shown in FIG. 12 is an example of the property of lithium vanadium phosphate that is relatively difficult to degrade. A straight line (2) shown in FIG. 12 is an example of the property of NCA that is relatively easy to degrade.

Depending on the deterioration speeds due to the types of the active materials as shown in FIG. 12, FIG. 13 shows the charging property of the secondary battery 230 before being degraded and the charging property of the secondary battery 230 after being degraded.

FIG. 13 shows a graph of the second embodiment illustrating the charging property of the secondary battery 230 before being degraded and the charging property of the secondary battery 230 after being degraded. A solid line (1) shown in FIG. 13 illustrates an example of the charging property of the secondary battery 230 before being degraded (initial state). A dashed line (2) shown in FIG. 13 illustrates an example of the charging property of the secondary battery 230 after being degraded.

In the example shown in FIG. 13, when comparing the ranges A and C, in which the property of lithium vanadium phosphate dominantly appears that is relatively difficult to degrade, with the ranges A' and C' after being degraded, flat range widths do not almost change. That is, in the ranges A and C, in which the property of lithium vanadium phosphate dominantly appears, the capacities do not almost change even after being degraded.

On the other hand, when comparing the ranges B and D, in which the property of NCA dominantly appears that is relatively easy to degrade, with the ranges B' and D' after being degraded, inclinations of the ranges B' and D' are larger and widths of the ranges B' and D' are narrower. That is, in the ranges B and D, in which the property of NCA dominantly appears, the capacities after being degraded are decreased.

As described above, the secondary battery 230 of the second embodiment includes the ranges depending on the property of the active material (first active material) whose degradation speed is fast and the ranges depending on the property of the active material (second active material) whose degradation is slow in the constant current charge curved line. Thus, when the degradation proceeds, the active materials, relatively easy to degrade, degrade first, and the capacities of the ranges depending on the property of that active materials become smaller in comparison with the initial capacities. Further, contribution of each active material to the charging property varies depending on a battery voltage. For example, between 2.5 V to 4.2 V of the battery voltage, a plurality of ranges whose properties are different depending on the respective active materials are present.

Specifically, in the vicinity of the battery voltage 3.5 V and in the vicinity of the battery voltage 3.8 V, the property of lithium vanadium phosphate, whose capacity does not almost change by the degradation, appears in the constant current charge curved line. Further, between the vicinity of the battery voltage 3.5 V and the vicinity of the battery voltage 3.8 V, and between the vicinity of the battery voltage 3.8 V and the battery voltage 4.2 V, the property of NCA, whose capacity decreases due to the degradation, dominantly appears in the constant current charge curved line. It should be noted that the charge termination voltage of the secondary battery 230 is 4.2 V.

In the second embodiment including the above described secondary battery 230, a property value of at least one of the range A, the range B, the range C and the range D is calculated. Then, the calculated property value is compared with an initial property value of the range, for which the property value is calculated. Thereby, degradation status can be estimated and whether the secondary battery 230 is degraded can be determined. In the second embodiment, the property value is calculated as "capacity".

Focusing on the above described point, the degradation determination unit 224 of the second embodiment uses, for example, the capacity of the range D or the capacity of the range C as an index of the degradation to determine that the secondary battery 230 is degraded when the capacity of the range D or the capacity of the range C becomes equal to or less than a predetermined percent of the initial property value. A specific value of the predetermined percent may be determined as appropriate. For example, the predetermined percent is 70%.

It should be noted that the capacities before being degraded in the respective ranges are calculated in advance, and stored in a memory or the like that the BCU 220A includes.

In the following, selection, by the BCU 220A of the second embodiment, of the output property data in accordance with the degradation of the secondary battery 230 will be described with reference to FIG. 14. FIG. 14 is a flowchart illustrating the selection of the output property data by the BCU 220A of the second embodiment. It should be noted that processes shown in FIG. 14 represent a case in which the capacity of the range D is used as the index to determine the degradation of the secondary battery 230 in a state in which the voltage of the secondary battery 230 is less than 3.8 V.

In step S1401, the BCU 220A of the second embodiment detects a start of charging to the secondary battery 230 by a constant current. Specifically, in a case in which the moving body 100 is a Plug-in Hybrid Electric Vehicle (PHEV) for example, the BCU 220A detects the start of the charging to the secondary battery 230 by the constant current when it is detected that an external power supply plug provided on the moving body 100 is plugged into an outlet.

Subsequently, in step S1402, the BCU 220A causes the battery status detection unit 221 to measure (monitor) the secondary battery 230.

Subsequently, in step S1403, the BCU 220A causes the degradation determination unit 224 to determine whether a battery voltage of the secondary battery 230 reaches the charge termination voltage 4.2 V. In a case in which the battery voltage dose not reach 4.2 V (No in step S1403), the BCU 220A returns the process to step S1402.

In a case in which the battery voltage reaches 4.2 V (Yes in step S1403), the BCU 220A causes the degradation determination unit 224 to calculate a capacity of the range D in step S1404. It should be noted that when the battery voltage reaches 4.2 V, charging to the secondary battery 230 is terminated.

In the following, the calculation of the capacity of the range D will be described. The degradation determination unit 224 of the second embodiment holds (stores), from the start of the constant current charge to the end, information on current, a temperature, and a voltage that the battery status detection unit 221 obtains. Then, when the constant current charge ends, the degradation determination unit 224 calculates the capacity of the range D based on the held information.

For example, in a case in which a boundary voltage between the range C and the range D is $3.8+\alpha$ V ($\alpha$ is a preset value), the degradation determination unit 224 calculates the capacity of the range D by calculating an integrated quantity of charging current until the battery voltage increases from $3.8+\alpha$ V to 4.2 V.

Subsequently, in step S1405, the degradation determination unit 224 determines whether the calculated capacity of the range D is equal to or less than 70% of an initial capacity of the range D.

In a case in which the calculated capacity of the range D is equal to or less than 70% of the initial capacity of the range D (Yes in step S1405), the degradation determination unit 224 determines that the secondary battery 230 is degraded, and the output property selection unit 225 selects the output property data 30 in step S1406. Then, the process ends.

Further, in a case in which the calculated capacity of the range D is greater than 70% of the initial capacity of the range D (No in step S1405), the degradation determination unit 224 determines that the secondary battery 230 is not degraded, and the output property selection unit 225 selects the output property data 20 in step S1407. Then, the process ends.

The output property data 20 or the output property data 30 selected by the output property selection unit 225 is referred to by the SOC estimation unit 222 and used to estimate the SOC and the output of the secondary battery 230.

As described above, according to the second embodiment, it can be determined whether the secondary battery 230 is degraded without fully discharging the secondary battery 230. Therefore, according to the second embodiment, it can be determined whether the secondary battery 230 is degraded without obstructing a convenience and degrading the secondary battery 230. In other words, the degradation status of the secondary battery 230 can be estimated.

Further, according to the second embodiment, in a case in which the secondary battery 230 is degraded, the output property data 30 corresponding to the degradation status can be used to estimate the output of the secondary battery 230. Further, similar to the output property data 20, in the output property data 30 of the second embodiment, the number of records in a predetermined range, which includes the SOC corresponding to the local maximum value O1-1, the number of records in a predetermined range, which includes the SOC corresponding to the local maximum value O2-1, and the number of records in a predetermined range, which includes the SOC corresponding to the local minimum value O3-1 are greater than the number of records in other ranges.

Further, in the second embodiment, because the electricity can be supplied from the secondary battery 230 within the range in which the SOC value is low even when the secondary battery 230 is degraded, the secondary battery 230 can be maintained in a state of low SOC. Therefore, according to the second embodiment, the degradation of the secondary battery 230 can be prevented.

It should be noted that the final voltage of the range D does not have to be a voltage (charge termination voltage) at the time of being fully charged. The final voltage of the range D may be a voltage before being fully charged such as 4.15 V, for example. In this way, in a range of a full charge side of the constant current charge curved line, the capacity may be calculated with a voltage equal to or less than a predetermined voltage in order not to fully charge the secondary battery 230. Thus, the degradation status of the secondary battery 230 can be estimated even when it is not fully charged.

Further, although the capacity of the range D is used for the index of the determination of the degradation in FIG. 14, alternatively, the capacity of the range B may be used as the index. Moreover, (the capacity of the range C)+(the capacity of the range D), (the capacity of the range B)+(the capacity of the range C), (the capacity of the range B)+(the capacity of the range C)+(the capacity of the range D), or the like may be used as the index.

It should be noted that although the storage unit 10A of the second embodiment stores the output property data 30 as output property data (data of the degraded secondary battery 230) to be used when the secondary battery 230 is degraded, the present invention is not limited to this. Other than the output property data 20 and the output property data 30, the storage unit 10A may store a plurality of output property data sets in accordance with degree of the degradation.

For example, the storage unit 10A may store output property data corresponding to an output property of a case in which the capacity of the D range becomes equal to or less than 80% of the initial capacity, and output property data corresponding to an output property of a case in which the capacity of the D range becomes equal to or less than 60% of the initial capacity. In this case, the degradation determination unit 224 may determine a degree of the degradation of the secondary battery 230 in accordance with a ratio of the calculated capacity of the range D to the initial capacity of the range D, and the output property selection unit 225 may select output property data corresponding to the degree of the degradation.

Further, although the degradation determination unit 224 of the second embodiment determines whether the secondary battery 230 is degraded without completely discharging the secondary battery 230, the present invention is not limited to this. Whether the secondary battery 230 is degraded may be determined by a method in which the secondary battery 230 is completely discharged, or another known method.

Third Embodiment

Next, a third embodiment will be described with reference to FIGS. 15 to 18. The third embodiment differs from the second embodiment in that a differential quantity obtained by differentiating a capacity with respect to a voltage is used to determine the degradation. In the following descriptions of the third embodiment, differences between the third embodiment and the second embodiment will be described. Similar reference numbers, used in the descriptions of the second embodiment, are given to elements of the third embodiment similar to the elements of the second embodiment, and their descriptions may be omitted as appropriate.

FIG. 15 shows a graph illustrating a voltage-differential quantity property (property of the differential quantity with respect to the voltage) of the secondary battery 230 of the third embodiment. FIG. 15 shows an example of relation between voltages and differential quantities obtained by differentiating the capacities of the secondary battery 230 with respect to the voltages.

In FIG. 13 described in the second embodiment, the ordinate indicates the voltage (V) and the abscissa indicates the capacity (Ah). Because the capacity is decreased when the degradation proceeds, in FIG. 13, inclinations of graph waveforms in the ranges B' and D' of the broken line (2), which indicates the property after being degraded, are larger than inclinations of graph waveforms in the ranges B and D of the solid line (1), which indicates the initial property.

On the other hand, in FIG. 15 of the third embodiment, an abscissa indicates a voltage (V) and an ordinate indicates a differential quantity (dQ/dV) obtained by differentiating the capacity with respect to the voltage. Thus, in FIG. 15, the local maximum values in the range A and the range C, which are relatively flat in FIG. 13, are greater than the local maximum values in the range B and the range D.

FIG. 16 shows a graph of the third embodiment illustrating the differential quantity property with respect to the voltage of the secondary battery 230 before being degraded and the differential quantity property with respect to the voltage of the secondary battery 230 after being degraded. In FIG. 16, the local maximum values are difficult to vary in the ranges A and C in which the property of lithium vanadium phosphate, which is the active material relatively difficult to degrade, dominantly appears. On the other hand, in the ranges B and D in which the property of NCA, which is the active material relatively easy to degrade, dominantly appears, the local maximum values are easy to vary (decrease) due to the degradation. A solid line (1) shown in FIG. 16 illustrates the voltage-differential quantity property of the secondary battery 230 before being degraded (initial state). A dashed line (2) shown in FIG. 16 illustrates the voltage-differential quantity property of the secondary battery 230 after being degraded.

In the third embodiment, the local maximum value of the differential quantity obtained by differentiating the capacity of the secondary battery 230 with respect to the voltage is used as a property value to be compared instead of the capacity of the secondary battery 230. Then, it is determined whether the secondary battery 230 is degraded.

Specifically, the degradation determination unit 224 of the third embodiment uses, for example, the local maximum value of the differential quantity of the range B or the local maximum value of the differential quantity of the range C as an index of the degradation to determine that the secondary battery 230 is degraded when the local maximum value of the differential quantity of the range B or the local maximum value of the differential quantity of the range C becomes equal to or less than a predetermined percent of the initial property value. A specific value of the predetermined percent may be determined as appropriate. For example, the predetermined percent is 70%.

In the following, selection of the output property data by the BCU 220A of the third embodiment will be described with reference to FIG. 17.

FIG. 17 is a flowchart illustrating the selection of the output property data by the BCU 220A of the third embodiment. It should be noted that processes shown in FIG. 17 represent a case in which the local maximum value of the differential quantity obtained by differentiating the capacity of the range B with respect to the voltage is used as the index to determine the degradation of the secondary battery 230 in a state in which the voltage of the secondary battery 230 is less than 3.6 V.

Because processes in step S1701 and step S1702 of FIG. 17 are similar to the processes in step S1401 and step S1402 of FIG. 14, their descriptions are omitted.

Subsequently, in step S1703, the BCU 220A causes the degradation determination unit 224 to determine whether a battery voltage of the secondary battery 230 reaches 3.7 V which is a boundary voltage between the range B and the range C. In a case in which the battery voltage does not reach 3.7 V (No in step S1703), the BCU 220A returns the process to step S1702.

In a case in which the battery voltage reaches 3.7 V (Yes in step S1703), the degradation determination unit 224 calculates the local maximum value of the differential quantity of the range B shown in FIG. 16 in step S1704.

It should be noted that the degradation determination unit 224 calculates the maximum value of the differential quantity of the range B shown in FIG. 16 based on information (battery voltage, charge current, temperature) held (stored) until the battery voltage reaches 3.7 V from the start of the constant current charge.

Specifically, for example, in a case in which the local minimum value of the differential quantity of the boundary between the range A and the range B is 3.6 V and the local minimum value of the differential quantity of the boundary between the range B and the range C is 3.7 V, while the battery voltage of the secondary battery 230 increases from 3.6 V to 3.7 V, an integration quantity/ΔV is calculated every time the voltage of the secondary battery 230 increases by ΔV (for example, 0.05 mV). Then, among the calculated values, the greatest value can be handled as the local maximum value of the differential quantity of the range B.

Subsequently, in step S1705, the degradation determination unit 224 determines whether the calculated local maximum value is equal to or less than 70% of the initial value. It should be noted that initial values of the local maximum values in the respective ranges are stored in the BCU 220A in advance.

In a case in which the calculated maximum value is equal to or less than 70% of the initial value (Yes in step S1705), the process goes to step S1706. In a case in which the calculated maximum value is not equal to or not less than 70% of the initial value (No in step S1705), the process goes to step S1707.

Because processes in step S1706 and step S1707 of FIG. 17 are similar to the processes in step S1406 and step S1407 of FIG. 14, their descriptions are omitted.

It should be noted that although the local maximum value of the range B is calculated when the battery voltage of the secondary battery 230 reaches 3.7 V in the example of FIG. 17, the present invention is not limited to this. For example, the local maximum value of the range B may be calculated after the battery voltage of the secondary battery 230 reaches the charge termination voltage and the charge is finished.

Further, although the local maximum value of the differential quantity of the range B is used as the index in the example of FIG. 17, alternatively, the local maximum value of the differential quantity of the range D may be used as the index. In this case, the local maximum value of the differential quantity may be calculated with a voltage equal to or less than a predetermined voltage in order not to fully charge the secondary battery 230. In this way, the degradation status of the secondary battery 230 can be estimated even when it is not fully charged.

Further, in the third embodiment, (the local maximum value of the differential quantity of the range C)+(the local maximum value of the differential quantity of the range D), (the local maximum value of the differential quantity of the range B)+(the local maximum value of the differential quantity of the range C), (the local maximum value of the differential quantity of the range B)+(the local maximum value of the differential quantity of the range C)+(the local maximum value of the differential quantity of the range D), or the like may be used as the index.

Moreover, as for the range A, in a case in which the secondary battery 230 is to be fully discharged or discharged to a range in which the local maximum value of the differential quantity can be calculated, the local maximum value of the range A may be used as the index of the determination of the degradation.

Further, the voltage-differential quantity property shown in FIG. 15 may be used to calculate the respective capacities of the ranges A to D. In the following, with reference to FIG. 18, calculation, using the voltage-differential quantity property, of the capacities of the respective ranges will be described. FIG. 18 shows a graph illustrating the calculation of the capacities of the respective ranges using the voltage-differential quantity property.

In the calculation of the capacities using the voltage-differential quantity property, the capacities of the respective ranges are calculated based on areas of full widths at half maximum. As shown in FIG. 18, the full widths at half maximum can be calculated from the local maximum values and the local minimum values in the ranges A to D. Respective shaded areas of the ranges A to D in FIG. 18 are the full widths at half maximum of the ranges. By calculating the areas of the full widths at half maximum in the respective ranges A to D, the capacities of the ranges can be obtained. In other words, the area of the full width at half maximum becomes the capacity of the range.

Therefore, the degradation determination unit 224 may use the capacities calculated from the voltage-differential quantity property to determine the degradation.

Fourth Embodiment

Next, a fourth embodiment will be described with reference to FIG. 19. The fourth embodiment differs from the second embodiment in that functions that represent curved lines that represent output properties are stored in a storage unit 10A of the fourth embodiment instead of the output property data. In the following descriptions of the fourth embodiment, differences between the fourth embodiment and the second embodiment will be described. Similar reference numbers, used in the descriptions of the second embodiment, are given to elements of the fourth embodiment similar to the elements of the second embodiment, and their descriptions may be omitted as appropriate.

FIG. 19 is a block diagram illustrating a functional configuration of a BCU 220B of the fourth embodiment. The BCU 220B of the fourth embodiment includes the battery status detection unit 221, the SOC estimation unit 222, the communication unit 223, the degradation determination unit 224, an output property selection unit 225A, and the storage unit 10B.

The storage unit 10B stores an output property function f(1) and an output property function f(2). The output property selection unit 225A selects the output property function in accordance with a determination result by the degradation determination unit 224.

The output property function f(1) of the fourth embodiment is an approximate formula of the curved line R1 shown in FIG. 9, and the output property function f(2) of the fourth embodiment is an approximate formula of the curved line R2 shown in FIG. 9. That is, the output property function f(1) is a formula that represents the relation between the SOC values and the output densities of the secondary battery 230 before being degraded, and the output property function f(2) is a formula that represents the relation between the SOC values and the output densities of the secondary battery 230 after being degraded. The output property functions f(1) and f(2) can be acquired by a known method based on the curved lines R1 and R2.

Further, the storage unit 10B of the fourth embodiment may store a plurality of output property functions in accordance with degree of the degradation of the secondary battery 230.

According to the fourth embodiment, because the storage unit 10B stores, instead of the output property data 20 and the output property data 30, the functions f(1) and f(2) that approximate the curved lines that represent the output properties, effects similar to the effects of the second embodiment can be obtained. Further, according to the fourth embodiment, a memory area of the storage unit 10B can be reduced in comparison with a case of storing the output property data 20 and the output property data 30.

Further, the present invention is not limited to these embodiments, but various variations and modifications may be made without departing from the scope of the present invention.

The present application is based on and claims the benefit of priority of Japanese Priority Application No. 2015-120731 filed on Jun. 16, 2015, and Japanese Priority Application No. 2016-082371 filed on Apr. 15, 2016, with the Japanese Patent Office, the entire contents of which are hereby incorporated by reference.

REFERENCE SIGNS LIST

10, 10A, 10B storage unit
20, 30 output property data
100 moving body
110 engine
120 motor
130 ECU
140 rotation shaft
200 charge control apparatus
210 battery pack
220, 220A, 220B BCU
221 battery status detection unit
222 SOC estimation unit
224 degradation determination unit
225 output property selection unit
230 secondary battery
240 BMU

The invention claimed is:

1. A system, comprising:
   circuitry configured to store output property data including groups of residual capacities of a secondary battery and output densities corresponding to the residual capacities, and
   a control apparatus configured to control movement of a movable body based on the output property data and the output densities stored in the circuitry,
   wherein in the output property data, both a difference between a residual capacity of a group that includes an extreme value in the output densities and a residual capacity of a group that includes an output density that immediately precedes the extreme value, and a difference between the residual capacity of the group that includes the extreme value in the output densities and a residual capacity of a group that includes an output density that immediately follows the extreme value are less than a difference between output densities of other groups adjacent to each other,
   wherein the output property data is first output property data and the circuitry is configured to store, as second output property data, information regarding degradation of the secondary battery, and
   wherein one of the first output property data or the second property data is used to estimate a residual capacity of the secondary battery based on whether the secondary battery is determined to be degraded.

2. The system according to the claim 1,
   wherein the output densities includes a first local maximum value and a second local maximum value that is less than the first local maximum value, and
   wherein the extreme value is the second local maximum value.

3. The system according to the claim 2,
   wherein both a difference between a residual capacity of a group that includes the first local maximum value and a residual capacity of a group that includes an output density that immediately precedes the first local maximum value, and a difference between the residual capacity of the group that includes the first local maximum value and a residual capacity of a group that includes an output density that immediately follows the first local maximum value are greater than both a difference between a residual capacity of a group that includes the second local maximum value and a residual capacity of a group that includes an output density that immediately precedes the second local maximum value, and a difference between the residual capacity of the group that includes the second local maximum value and a residual capacity of a group that includes an output density that immediately follows the second local maximum value.

4. The system storage apparatus according to the claim 3,
   wherein the output property data includes, in a range in which the output densities increase in accordance with an increase of the residual capacities, a first output density, a first residual capacity corresponding to the first output density, a second output density that immediately precedes the first output density, a second residual capacity corresponding to the second output density, a third output density that immediately follows the first output density, and a third residual capacity corresponding to the third output density, the first output density being greater than the second output density, the third output density being greater than the first output density, the first residual capacity being greater than the second residual capacity, the third residual capacity being greater than the first residual capacity, and,
   wherein both the difference between the residual capacity of the group that includes the first local maximum value and the residual capacity of the group that includes the output density that immediately precedes the first local maximum value, and the difference between the residual capacity of the group that includes the first local maximum value and the residual capacity of the group that includes the output density that immediately follows the first local maximum value are less than both a difference between the first residual capacity and the second residual capacity and a difference between the first residual capacity and the third residual capacity.

5. A control apparatus for controlling a moving body, the control apparatus comprising:
   a storage apparatus configured to store output property data including groups of residual capacities of a secondary battery and output densities corresponding to the residual capacities; and
   the control apparatus being configured to control, in accordance with the output property data, movements of the moving body including an engine and a rotation shaft to be driven by electric power supplied from the secondary battery,
   wherein in the output property data, both a difference between a residual capacity of a group that includes an extreme value in the output densities and a residual capacity of a group that includes an output density that immediately precedes the extreme value, and a difference between the residual capacity of the group that includes the extreme value in the output densities and a residual capacity of a group that includes an output density that immediately follows the extreme value are less than a difference between output densities of other groups adjacent to each other,
   the output property data is first output property data, and the storage apparatus stores, as second output property data, information regarding degradation of the secondary battery, and
   the control apparatus is further configured to select one of the first output property data or the second output property data for use in estimating a residual capacity of the secondary battery based on whether the secondary battery is degraded.

6. The control apparatus according to claim 5, wherein the control apparatus is further configured to:
   detect status of the secondary battery; and
   estimate the residual capacity of the secondary battery based on the output property data and the status of the secondary battery; and
   actuate the moving body in accordance with the residual capacity estimated.

7. The control apparatus according to claim 6,
   wherein the control apparatus is further configured to determine whether the secondary battery is degraded, and
   the control apparatus is configured to use the first output property data or the second output property data selected thereby to estimate the residual capacity of the secondary battery.

8. The control apparatus according to claim 7,
   wherein the secondary battery includes an electrode containing at least a first active material and a second active material whose degradation speed is slower than a degradation speed of the first active material, wherein a constant current curved line of the secondary battery includes a first range depending on a property of the first active material, a second range depending on a property of the second active material, and a third range at a lower voltage side than the first range and the second range, and wherein the control apparatus calculates a property value of at least one of the first range, the second range, and the third range and compares the calculated property value with an initial property value corresponding to the calculated property value to determine whether the secondary battery is degraded based on a comparison result.

9. The control apparatus according to claim 8,
wherein the property value is a capacity of the secondary battery.

10. The control apparatus according to claim 9,
wherein a capacity of the first range and a capacity of the second range are calculated based on values of full widths at half maximum corresponding to the first range and the second range of a curved line that represents relation between voltages of the secondary battery and differential quantities obtained by differentiating capacities of the secondary battery with respect to the voltages.

11. The control apparatus according to claim 8,
wherein the property value is a local maximum value of the differential quantities obtained by differentiating the capacities of the secondary battery with respect to the voltages.

12. The control apparatus according to claim 5,
wherein the output property data includes a residual capacity corresponding to a first local minimum value in the output densities, a residual capacity corresponding to a local maximum value in the output densities that is greater than the first local minimum value, and a residual capacity corresponding to a second local minimum value in the output densities that is less than the local maximum value, and the residual capacity corresponding to the first local minimum value is greater than the residual capacity corresponding to the local maximum value, and wherein the control apparatus is configured to start an output from the secondary battery to supply the electric power to the rotation shaft when the residual capacity of the secondary battery becomes a predetermined value that is greater than the residual capacity corresponding to the second local minimum value and equal to or less than the residual capacity corresponding to the first local minimum value.

13. A moving body comprising:
a control apparatus comprising:
    a storage apparatus configured to store output property data including groups of residual capacities of a secondary battery and output densities corresponding to the residual capacities;
    wherein the control apparatus is configured to control, in accordance with the output property data, movements of the moving body including an engine and a rotation shaft to be driven by electric power supplied from the secondary battery;
the secondary battery;
a motor to be operated by the electric power supplied from the secondary battery; and
the engine,
wherein in the output property data, both a difference between a residual capacity of a group that includes an extreme value in the output densities and a residual capacity of a group that includes an output density that immediately precedes the extreme value, and a difference between the residual capacity of the group that includes the extreme value in the output densities and a residual capacity of a group that includes an output density that immediately follows the extreme value are less than a difference between output densities of other groups adjacent to each other,
the output property is first output property data, and the storage apparatus stores, as second output property data, information regarding degradation of the secondary battery, and
the control apparatus is further configured to select one of the first output property data or the second output property data for use in estimating a residual capacity of the secondary battery based on whether the secondary battery is degraded.

14. The moving body according to claim 13, wherein the moving body is a hybrid electric vehicle.

* * * * *